US009485092B2

(12) United States Patent
Smets et al.

(10) Patent No.: US 9,485,092 B2
(45) Date of Patent: Nov. 1, 2016

(54) ELECTRONIC AUTHENTICATION SYSTEMS

(71) Applicant: MASTERCARD INTERNATIONAL INCORPORATED, Purchase, NY (US)

(72) Inventors: Patrik Smets, Nijlen (BE); Patrick Mestre, Sart-Bernard (BE); Dave Roberts, Warrington (GB); Duncan Garret, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 116 days.

(21) Appl. No.: 14/298,280

(22) Filed: Jun. 6, 2014

(65) Prior Publication Data
US 2014/0365776 A1 Dec. 11, 2014

(30) Foreign Application Priority Data

Jun. 6, 2013 (GB) .................................. 1310084.7

(51) Int. Cl.
*H04L 9/08* (2006.01)
*G06Q 20/34* (2012.01)
(Continued)

(52) U.S. Cl.
CPC ........... *H04L 9/0841* (2013.01); *G06Q 20/341* (2013.01); *G06Q 20/3829* (2013.01); *H04L 9/0869* (2013.01); *H04L 9/3066* (2013.01);
(Continued)

(58) Field of Classification Search
CPC .................................................... H04L 9/0841
USPC ....................................................... 713/171
See application file for complete search history.

(56) References Cited

U.S. PATENT DOCUMENTS 5,491,749 A * 2/1996 Rogaway ....................... 713/171
7,139,917 B2 * 11/2006 Jablon ........................... 713/183
(Continued)

FOREIGN PATENT DOCUMENTS

EP 0 773 647 A2 5/1997
WO WO2006/066604 6/2006

OTHER PUBLICATIONS

"An identity based public key cryptography blind signature scheme from bilinear pairings", Shakerian R. et al.; Jul. 9, 2010; 6pgs.
(Continued)

*Primary Examiner* — Jacob Lipman
(74) *Attorney, Agent, or Firm* — Harness, Dickey & Pierce, P.L.C.

(57) ABSTRACT

A transaction device for establishing a shared secret with a point of interaction (POI) over a communications network to enable encrypted communications between the transaction device and the point of interaction, the device comprising: an input arranged to receive communications from the point of interaction; a processor arranged to generate a first communication according to a Diffie-Hellman protocol; an output arranged to send the first communication to the point of interaction; wherein the processor is arranged to apply a randomly generated blinding factor, r, when generating the first communication and wherein, in response to receiving a second communication from the point of interaction at the input, the second communication having been generated according to the Diffie-Hellman protocol, the processor is arranged to apply the randomly generated blinding factor and generate a shared secret according to the Diffie-Hellman protocol in dependence on data contained within the second communication.

20 Claims, 25 Drawing Sheets

(51) Int. Cl.
  *G06Q 20/38* (2012.01)
  *H04L 9/30* (2006.01)
(52) U.S. Cl.
  CPC ........ *H04L 2209/16* (2013.01); *H04L 2209/56* (2013.01)

(56) References Cited

U.S. PATENT DOCUMENTS 7,363,499 B2* 4/2008 Perlman .................. 713/176
8,681,986 B2* 3/2014 Jutla et al. ................ 380/262

OTHER PUBLICATIONS

"Realization of RF Distance Bounding", Kasper Bonne Rasmussen Department of Computer Science Eth Zurich 8092 Zurich et al.; Jun. 10, 2010; 14 pgs.
"Security Aspects of Distance-Bounding Protocols", Maria Cristina Onete; Jun. 20, 2012; 84 pgs.
"Detecting Relay Attacks with Timing-Based Protocols", Jason Reid et al.; Jan. 1, 2007; 10 pgs.
"Keep Your Enemies Close; Distance Bounding Against Smartcard Relay Attacks", Saar Drimer and Steven J. Murdocj Computer Laboratory et al.; Aug. 8, 2007; 16 pgs.
"Distance-Bounding Protocols", Stefan Brands et al.; May 23, 1993; 16 pgs.

* cited by examiner

ELECTRONIC AUTHENTICATION SYSTEMS

CROSS-REFERENCE TO RELATED APPLICATION

This application claims the benefit of and priority to Great Britain Application No. 1310084.7 filed Jun. 6, 2013. The entire disclosure of the above application is incorporated herein by reference.

FIELD

The present disclosure generally relates to electronic authentication systems, in particular those used for payment transactions.

BACKGROUND

Electronic authorisation systems for payment transactions use protocols such as those developed by EMVCo LLC which are published as specifications entitled "Integrated Circuit Card Specifications for Payment Systems". These specifications are for contact cards and are publically available and are currently at version 4.3 (currently available at http://www.emvco.com/specifications.aspx?id=223). An equivalent set of specifications for contactless devices, currently at version 2.4, has also been developed by EMVCo LLC and is also publicly available.

The specifications define a set of requirements to ensure interoperability between transaction devices, e.g. integrated circuit chip cards, and Points of Interaction (POIs), e.g. card terminals, on a global basis, regardless of the manufacturer, the financial institution, or where the card is used.

It is an object of the present disclosure to provide various improvements to existing electronic authentication systems for payment transactions. For example, whilst current payment technologies such as EMV transfer issuer decision making processes to the terminal, this present disclosure, at least partially, redefines the balance between the payment device and the POI whilst also protecting against new attacks and providing new transaction opportunities between transaction device holder and merchant.

STATEMENTS

According to a first aspect of the present disclosure there is provided a transaction device for establishing a shared secret with a point of interaction (POI) over a communications network to enable encrypted communications between the transaction device and the point of interaction, the device comprising: an input arranged to receive communications from the point of interaction; a processor arranged to generate a first communication according to a Diffie-Hellman protocol; an output arranged to send the first communication to the point of interaction; wherein the processor is arranged to apply a randomly generated blinding factor, r, when generating the first communication and wherein, in response to receiving a second communication from the point of interaction at the input, the second communication having been generated according to the Diffie-Hellman protocol, the processor is arranged to apply the randomly generated blinding factor and generate a shared secret according to the Diffie-Hellman protocol in dependence on data contained within the second communication.

The transaction device according to the present aspect of the disclosure applies a modified Diffie-Hellman exchange in which the transaction device applies a random blinding factor twice within the establishment of a secure channel with the point of interaction (POI). The blinding factor is applied in the outgoing message to the POI and again on the data received from the POI. In this manner the transaction device and POI may still generate a shared secret. Additionally, the data sent by the transaction device, for example, the transaction device's public key is hidden from view. Since the factor that is applied is random subsequent transactions will not be initiated with the same initial communication from the transaction device to the POI and consequently the user of the transaction device will have privacy of movement.

Preferably, the processor is arranged to use an elliptic Diffie-Hellman protocol. The device may comprise a static public key Qc and the processor is arranged to use the public key when generating the first communication.

The transaction device may conveniently comprise a public key Qc which is the product of a private key $d_c$ and a point G on a curve that is part of an elliptic group. It is noted that point G may be arranged to be known to both the transaction device and the point of interaction prior to the first communication being generated. In other words the point G may be known within the transaction system that the transaction device is used within prior to any transaction taking place.

The processor may be arranged to calculate $R = r \cdot Qc$ for inclusion in the first communication. The second communication may comprise an ephemeral public key $Q_t$ of the point of interaction where $Q_t = d_t \cdot G$ and $d_t$ is an ephemeral private key of the point of interaction. The processor may be arranged to generate the shared secret by combining the public key from the second communication with private key $d_c$ and applying the blinding factor r to generate $rd_c d_t \cdot G$.

In response to generating the shared secret, the processor may be arranged to generate a further communication to the point of interaction, the further communication comprising the public key of the transaction device, security certificates and the blinding factor r, the further communication being encrypted in dependence with the shared secret.

The processor may be arranged to calculate encryption key $K_c$ wherein $K_c = f(rd_c \cdot Q_t)$ and to encrypt subsequent communications with the point of interaction using key $K_c$.

In order to preserve privacy within the system the processor, at the end of a communication session with the point of interaction, may be arranged to delete the random blinding factor and the key $K_c$.

Preferably, the transaction device comprises a random number generator for generating the blinding factor r.

The present disclosure extends to a mobile communications device comprising a transaction device according to the first aspect of the disclosure. The mobile communications device may comprise a secure element, the transaction device being located at least partially within the secure element.

The present disclosure also extends to a bank transaction card comprising a transaction device according to the first aspect of the present disclosure.

According to a second aspect of the present disclosure, there is provided a method of establishing a shared secret between transaction device and a point of interaction (POI) over a communications network to enable encrypted communications between the transaction device and the point of interaction, the method comprising: generating, at the transaction device, a first communication according to a Diffie-Hellman protocol; sending the first communication to the point of interaction; wherein generating the first communication comprises applying a randomly generated blinding factor, r, and wherein, in response to receiving a second communication from the point of interaction at the input, the second communication having been generated according to the Diffie-Hellman protocol, the method comprises applying the randomly generated blinding factor and generating a shared secret according to the Diffie-Hellman protocol in dependence on data contained within the second communication.

According to a third aspect, there is provided a method of detecting relay attacks between first and second devices in a communications network, comprising: sending first data from the first device to the second device; receiving a communication from the second device, the communication comprising second data generated at the second device and a time parameter related to the generation of the second data; measuring a total transmission time at the first device between sending the first data to receiving the communication; determining a further time parameter related to the generation of the second data from the measured total transmission time; determining the presence of a relay attack between the first and second devices in dependence on a comparison of the time parameter and the further time parameter.

The method according to the present aspect of the present disclosure helps mitigate against relay attacks. First and second data, such as random numbers generated at respectively the first and second devices, are exchanged between the first and second devices. Additionally the second device sends the first device the time it took to generate its random number. The first device can then measure the total time for the message exchange to take place and, based on knowledge of the transmission speeds within the communication network can derive a value for the time the second device took to generate the second data. This derived value can then be compared with the time parameter value sent by the second device in order to determine if a relay attack is occurring.

Preferably, determining the presence of the relay attack may comprise determining if a difference between the time parameter and the further time parameter exceeds a predetermined threshold.

A further communication may be received from the second device at the first device, the further communication being over an encrypted channel and comprising the first and second data and the time parameter.

Determining the presence of the relay attack may comprise checking if the first and second data in the encrypted further communication match the first data sent in the sending step and the second data received in the first receiving step. (The further communication and the information contained therein allows the first device to verify that the first data it sent was received by the second device without interference by a third party. Furthermore, the second data and time parameter are included within the further communication to allow checking against the information received in the (earlier) communication from the second device. This also allows the first device to verify that there has been no interference in the communications with the second device.)

The communication received from the second device further may comprise an estimate, from the second device, of the total transmission time. The communication received from the second device may also further comprise an estimate, from the second device, of the time to send the communication from the second device over the communications network to the first device.

The first device may comprise a point of interaction. The second device may comprise a transaction device.

The transaction device according to the third aspect of the present disclosure may comprise the transaction device according to the first aspect of the present disclosure.

According to a fourth aspect of the present disclosure, there is provided a method of detecting relay attacks between first and second devices in a communications network, comprising: receiving first data from the first device at the second device; generating second data at the second device; determining a time parameter related to the generation of the second data; sending the second data and the time parameter to the first device to enable the presence of a relay attack to be determined.

According to a fifth aspect of the present disclosure, there is provided a point of interaction arranged to detect relay attacks in a communications network between the point of interaction and a transaction device, the point of interaction comprising an input, an output and a processor and being arranged to: send first data from the output to the transaction device; receive, at the input, a communication from the transaction device, the communication comprising second data generated at the transaction device and a time parameter related to the generation of the second data; measure a total transmission time at the point of interaction between sending the first data to receiving the communication; determine a further time parameter related to the generation of the second data from the measured total transmission time; determine the presence of a relay attack between the point of interaction and the transaction device in dependence on a comparison of the time parameter and the further time parameter.

According to a sixth aspect of the present disclosure there is provided a transaction device comprising: an input arranged to receive first data from a point of interaction; processor arranged to generate second data and a time parameter related to the generation of the second data; an output arranged to output a communication to the point of interaction, the communication comprising the second data and the time parameter.

According to a seventh aspect of the present disclosure there is provided a transaction device for interacting with a point of interaction to carry out a transaction, the device comprising: an input for receiving transaction data from the point of interaction; a processor for processing received transaction data; an output for outputting transaction data to the point of interaction wherein the processor comprises a payment application for processing a transaction with the point of interaction, the payment application being arranged to output transaction data formatted according to a given data format; the processor comprises a communication module functionally disposed between the input and output and the payment application; and wherein the communication module is arranged to map transaction data received via the input to the data format of the payment application and is arranged to reformat transaction data output from the payment application to a data format suitable for the point of interaction, the reformatted data output from the payment application being sent to the point of interaction via the output.

The transaction device according to the present aspect of the disclosure comprises a communication module which is disposed between the input/output on the one hand and a payment application on the other hand. The communication module is arranged to translate transaction data sent back and forth between the payment application and a point of interaction (POI) into an appropriate data format.

Preferably the transaction device comprises an authentication module arranged to establish a secure communication channel between the payment application and the point of interaction.

The device may comprise a plurality of payment applications. A single authentication module may be shared between the plurality of payment applications. Alternatively, each payment application may comprise an authentication module.

The transaction device may comprise a system environment module arranged to determine whether a payment application is eligible for a given transaction. In the event that the device comprises multiple payment applications, the system environment module may be arranged to compile a list of eligible payment applications for the given transaction.

The system environment module may be arranged to compare transaction data received from the point of interaction and point-of-interaction functionality data received from the point of interaction against functionality of each payment application on the transaction device in order to determine eligible payment applications.

According to an eighth aspect of the present disclosure there is provided a method of a transaction device interacting with a point of interaction to carry out a transaction, the device comprising an input for receiving transaction data from the point of interaction; a processor for processing received transaction data; and an output for outputting transaction data to the point of interaction, the processor comprising a payment application for processing a transaction with the point of interaction, the payment application being arranged to output transaction data formatted according to a given data format, and the processor comprising a communication module functionally disposed between the input and output and the payment application; the method comprising: receiving transaction data at the input; mapping, at the communication module, the transaction data received via the input to the data format of the payment application; reformatting transaction data output from the payment application to a data format suitable for the point of interaction, sending the reformatted data output from the payment application to the point of interaction via the output.

According to a ninth aspect of the present disclosure there is provided a method of a point-of-interaction device carrying out a transaction with a transaction device, the method comprising: sending a point-of-interaction message to the transaction device, the point-of-interaction message comprising: a data request component, the data request component relating to a data request from the point-of-interaction device to the transaction device for data relating to the transaction and a message data component, the message data component relating to message data satisfying a previous data request from the transaction device; receiving a transaction device message from the transaction device, the transaction device message comprising: a data request component, the data request component relating to a data request from the transaction device to the point-of-interaction device for data relating to the transaction and a message data component, the message data component relating to message data satisfying the data request from the point-of-interaction device in the point-of-interaction message; completing the transaction on the basis of the exchanged messages.

The method according to the present aspect of the disclosure provides a method of sending data messages between a point of interaction device (POI) and transaction device. Such messages allow the POI to request the information it requires to process a transaction and to respond to information that the transaction device requires. In this manner only the information required (and requested) in order to enable the transaction is exchanged which means that the communications between the devices are optimised.

The method may comprise exchanging a plurality of messages with the transaction device. The method may comprise sending further point of interaction messages and receiving further transaction device messages.

The point of interaction device, when sending a further point of interaction message, may be arranged to only enclose data objects that have been requested by the transaction device in the data request component of the previous transaction device message.

The point of interaction device, when sending a further point of interaction message, may be arranged to enclose data objects in an order requested by the transaction device in previous transaction message.

According to a tenth aspect of the present disclosure there is provided a method of a transaction device carrying out a transaction with a point of interaction device, the method comprising: sending a transaction device message to the point-of-interaction device, the transaction device message comprising: a data request component, the data request component relating to a data request from the transaction device to the point-of-interaction message device for data relating to the transaction and a message data component, the message data component relating to message data satisfying a previous data request from the point-of-interaction message device; receiving a point-of-interaction message device message from the point-of-interaction message device, the point-of-interaction device message comprising: a data request component, the data request component relating to a data request from the point-of-interaction message device to the transaction device for data relating to the transaction and a message data component, the message data component relating to message data satisfying the data request from the transaction device in the transaction device message; completing the transaction on the basis of the exchanged messages.

The disclosure extends to a point of interaction (point of interaction device) and transaction device arranged to carry out the methods of the ninth and tenth aspects of the present disclosure.

According to an eleventh aspect of the present disclosure there is provided a message exchanged between first and second devices during a transaction, the message comprising: a data request component, the data request component relating to a data request from the first device to the second device for data relating to the transaction and a message data component, the message data component relating to message data satisfying a previous data request from the second device.

The present aspect of the disclosure provides a message format for exchanging messages between a point of interaction and a transaction device.

The message data component may comprise no data (e.g. the first message exchange in a series of message exchanges may comprise a data request component and an empty message data component [because there is no previous message to reply to].

According to a twelfth aspect of the present disclosure there is provided a transaction device comprising: an input and an output for communicating with a point of interaction; a processor arranged to process transaction data with the point of interaction, the processor being in communication with a data store wherein the processor is arranged to store transaction data relating to a transaction in the data store during the course of the transaction and, in response to an interruption in the transaction with the point of interaction, is arranged to retrieve transaction data stored in the data store in order to resume the transaction with the point of interaction when communications with the point of interaction are restored.

The transaction device according to the present aspect of the disclosure stores transaction data during a transaction such that in the event of an interruption in the transaction (e.g. power loss, device removal) the transaction data can be reloaded when communications are restored.

The data store may comprise a non-volatile memory module. The non-volatile memory module may comprise an EEPROM module. The non-volatile memory module may comprise a secure element and the processor is arranged to store transaction data in the secure element.

The processor may be arranged to clear the transaction data stored in the data store following completion of a transaction.

The processor may be arranged to store one or more of the following transaction data types: transaction amount, transaction items, data/time data, transaction identifier.

The transaction device may further comprise a payment application for managing the transaction on the transaction device, wherein the processor is arranged to store transaction data in response to predetermined actions or decisions taken by the payment application.

The processor may comprise a transaction device for interacting with a point of interaction to carry out a transaction according to the seventh aspect of the present disclosure.

According to further aspect of the disclosure there is provided a method of operating a transaction device, the transaction device comprising: an input and an output for communicating with a point of interaction and a processor arranged to process transaction data with the point of interaction, the processor being in communication with a data store, the method comprising: storing transaction data relating to a transaction in the data store during the course of the transaction and, in response to an interruption in the transaction with the point of interaction, retrieving transaction data stored in the data store in order to resume the transaction with the point of interaction.

The disclosure extends to a carrier medium for carrying a computer readable code for controlling a transaction device to carry out the method of any the second, third, fourth, eighth, tenth and further aspects of the disclosure.

The disclosure extends to a non-transitory computer-readable storage medium storing executable computer program instructions implementing any of the second, third, fourth, eighth, tenth and further aspects of the disclosure.

In the above aspects of the present disclosure the transaction device may comprise a bank transaction card or a mobile communications device comprising a secure element. The point of interaction (POI) may comprise a point of sale terminal.

FIGURES

Embodiments of the disclosure will now be described, by way of example, with reference to the accompanying Figures, of which:

Figure 6A:
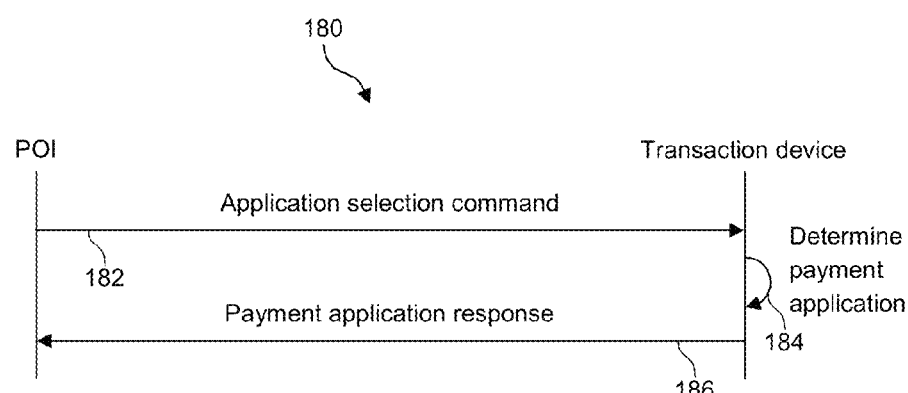
Figure 7:
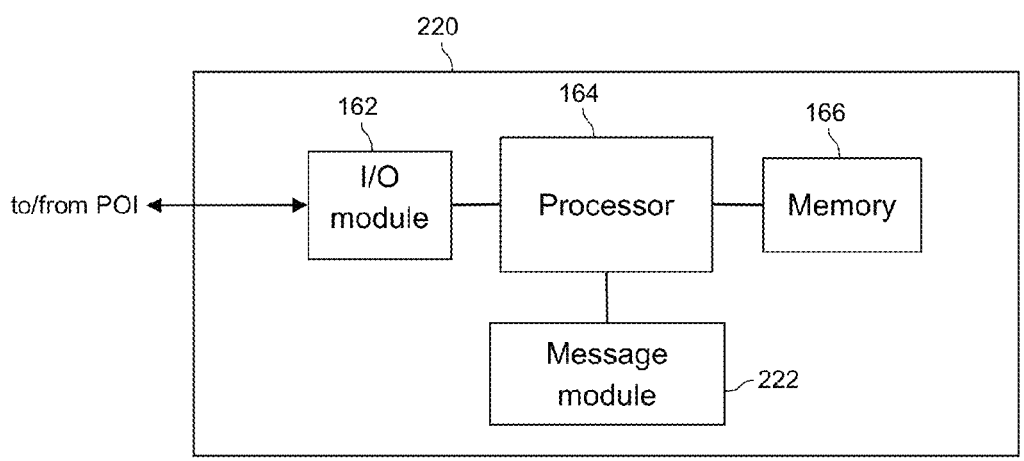
Figure 8:
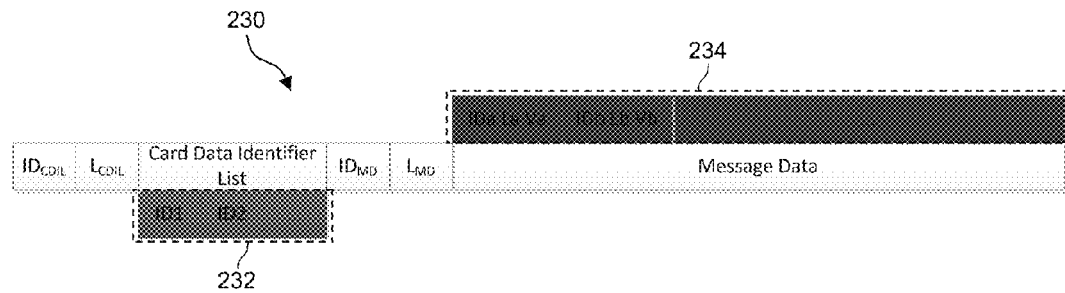
Figure 9:
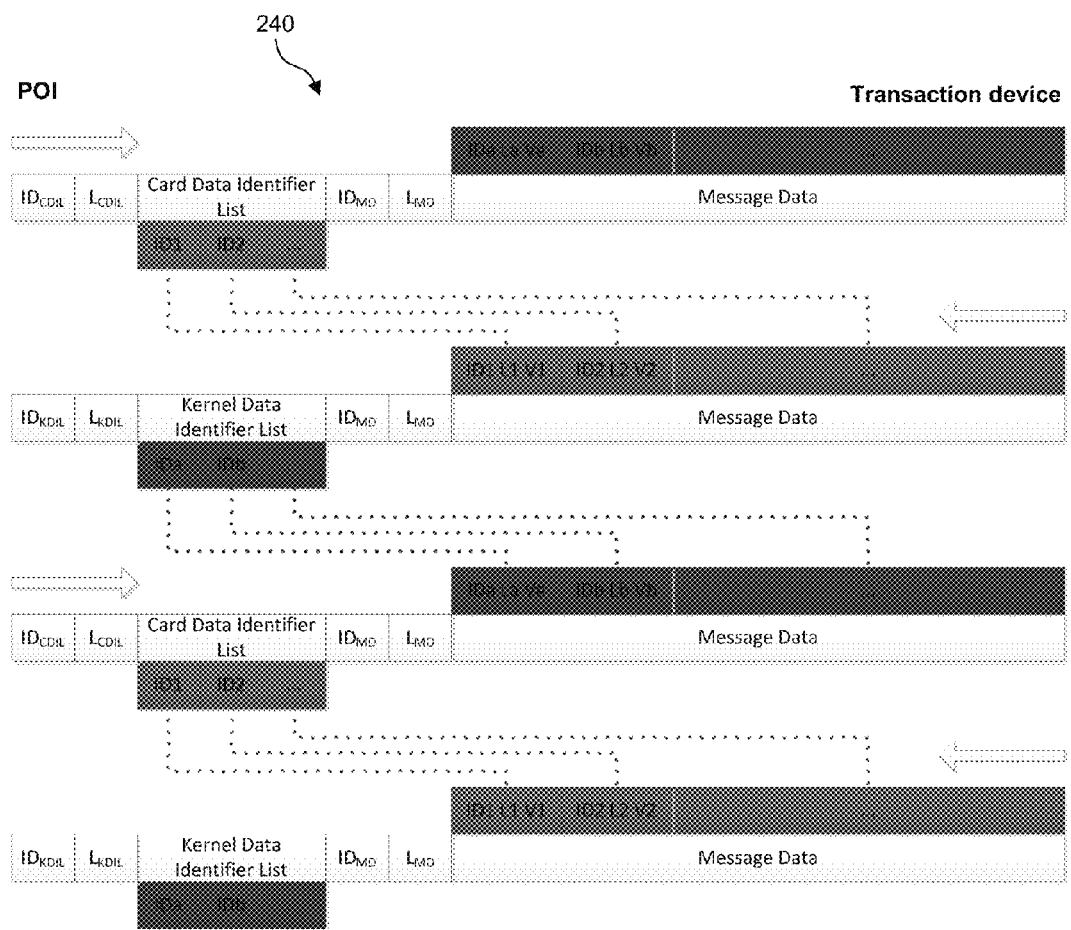
Figure 10A:
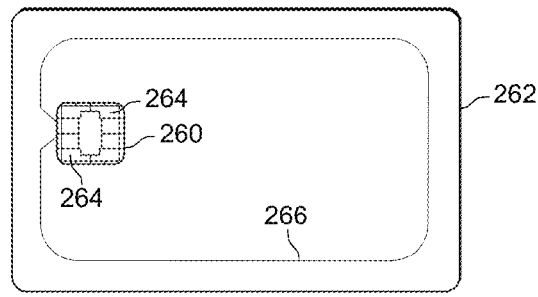
Figure 10B:
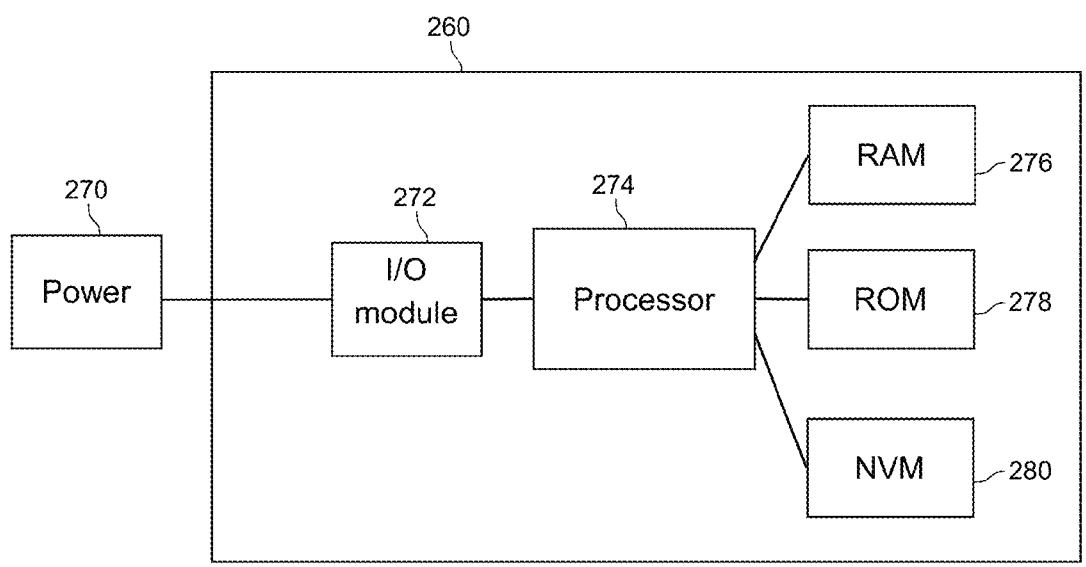

FIGS. 6(a) and (b) are example prior art dataflows between a POI and a transaction device;

FIG. 7 is a schematic block diagram of an integrated circuit chip according to an embodiment of the disclosure;

FIG. 8 is a schematic block diagram of a message according to an embodiment of the disclosure;

FIG. 9 is a schematic block diagram of an example exchange of a plurality of messages between a POI and a transaction device;

FIG. 10(a) is a schematic block diagram of a transaction device comprising an integrated circuit chip and an induction circuit;

FIG. 10(b) is a schematic block diagram of the integrated circuit chip of FIG. 10(a)

Figure 11:
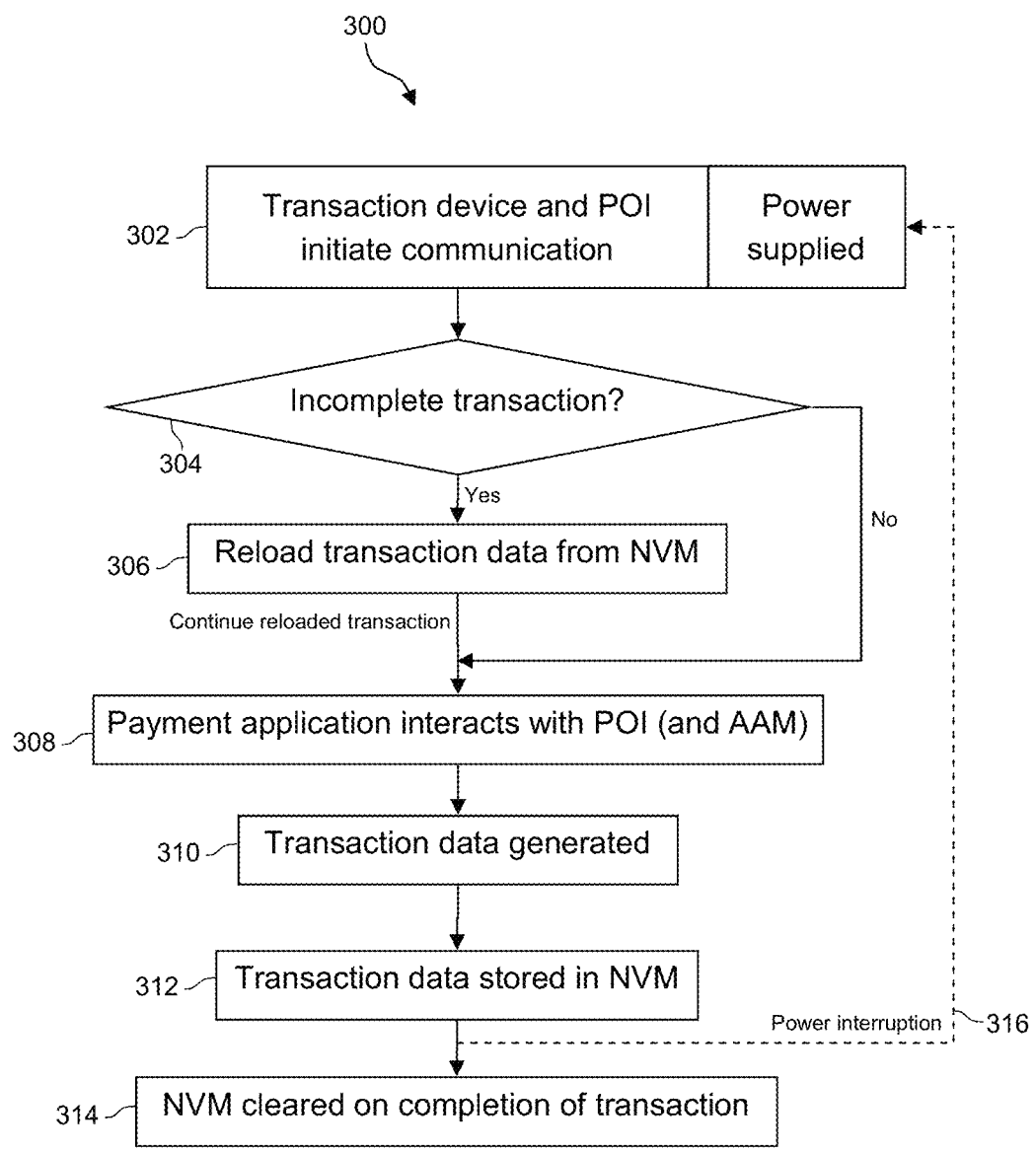
Figure 12:
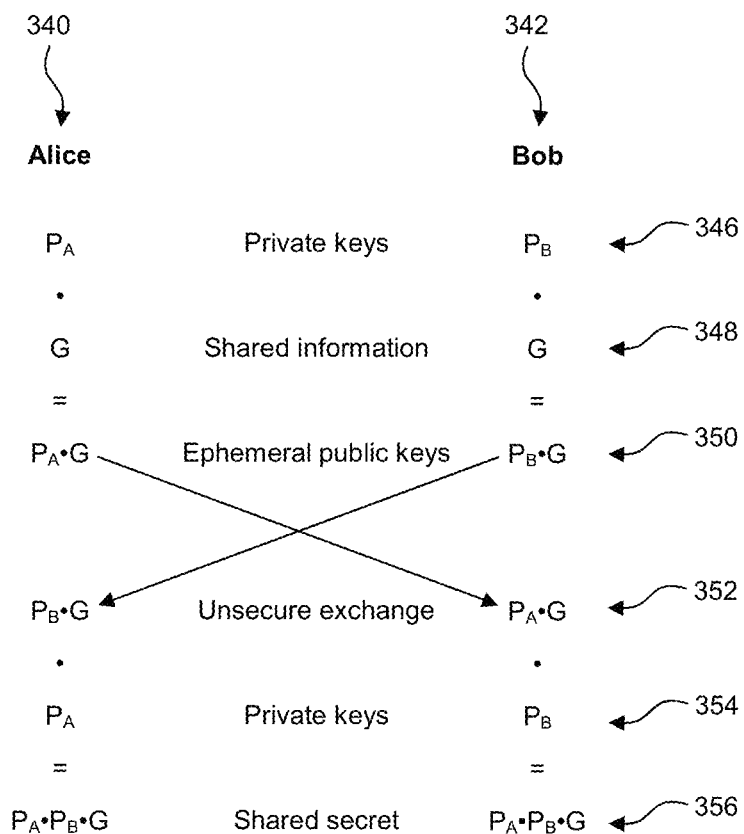
Figure 13:
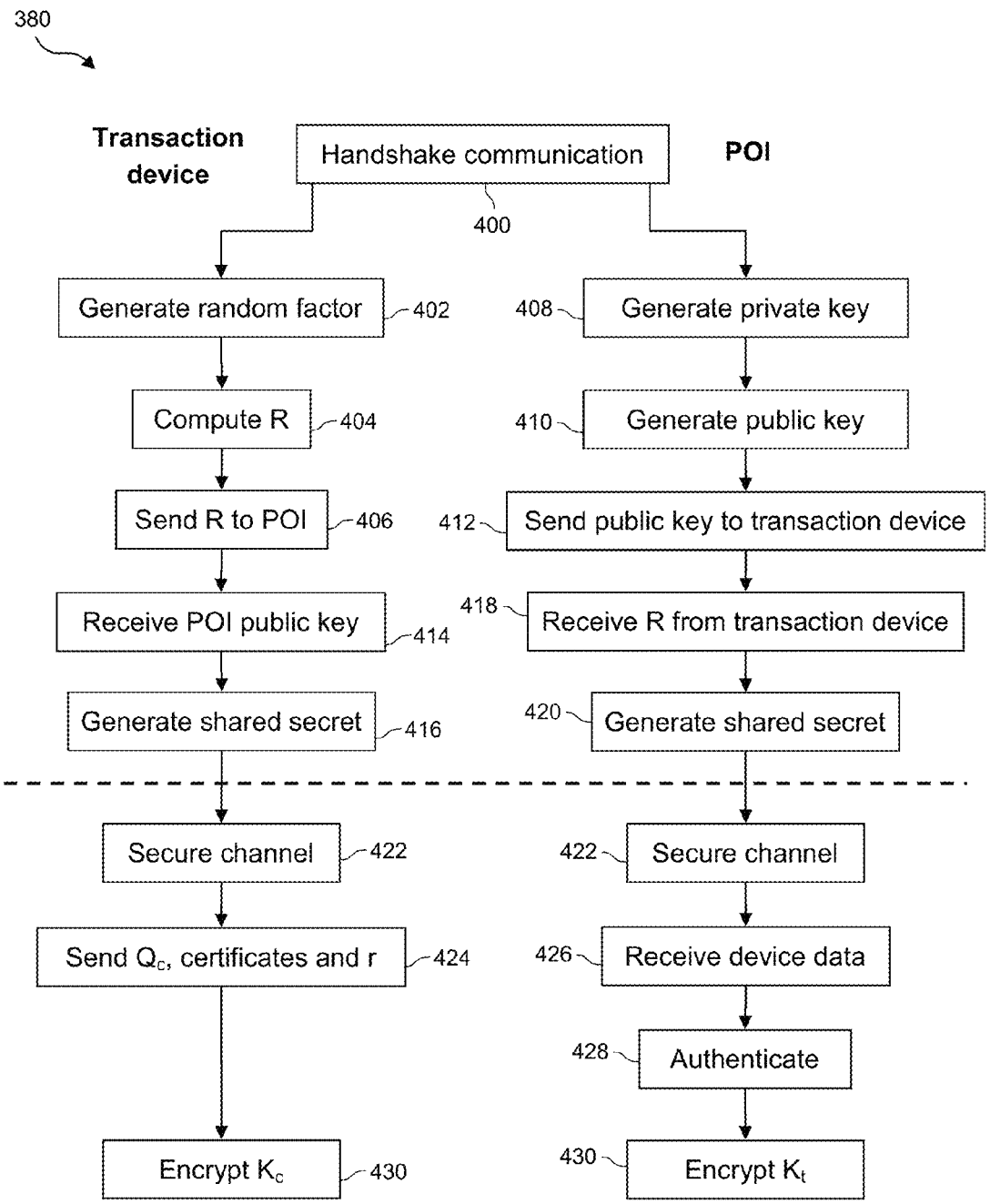
Figure 14:
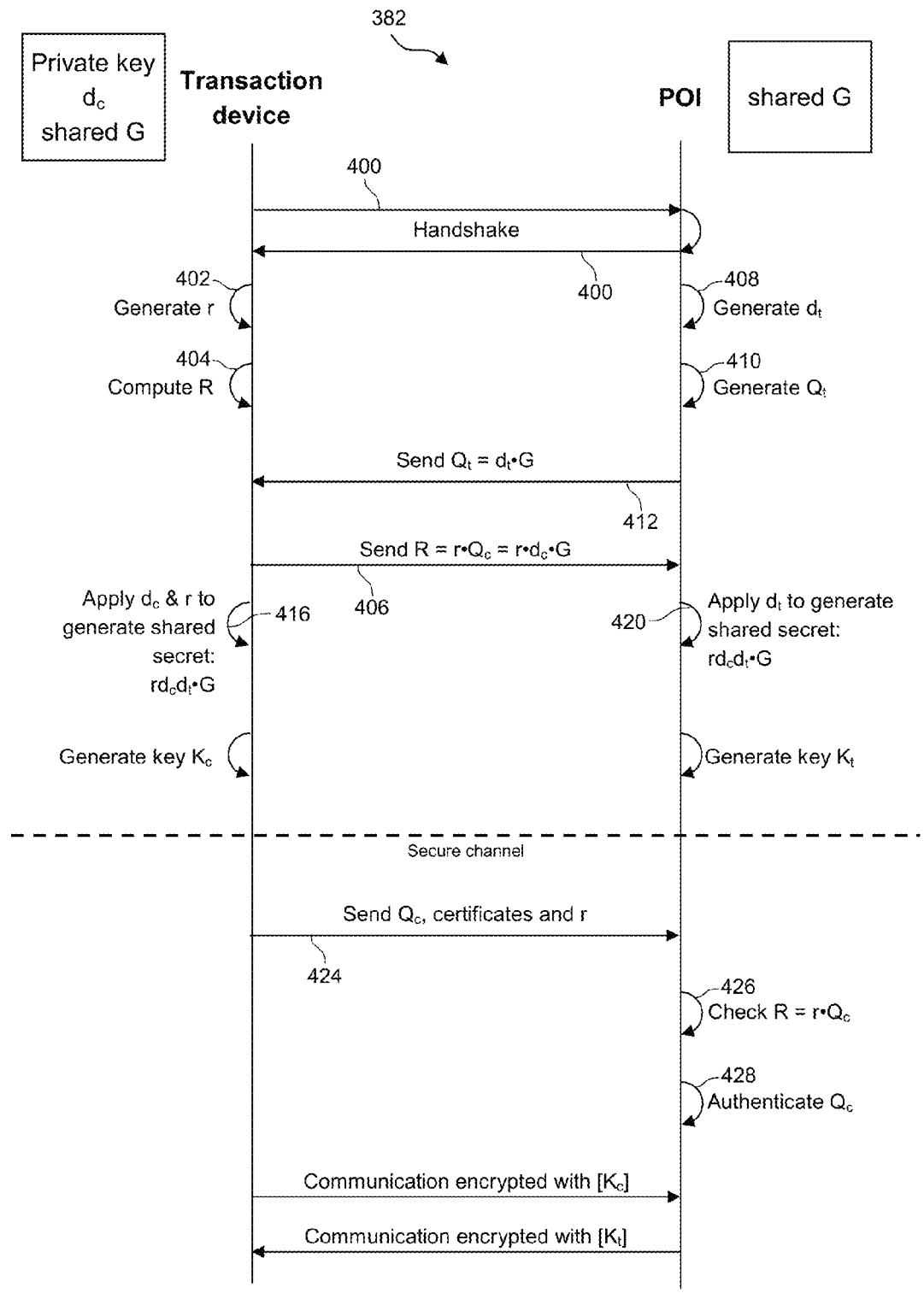
Figure 15:
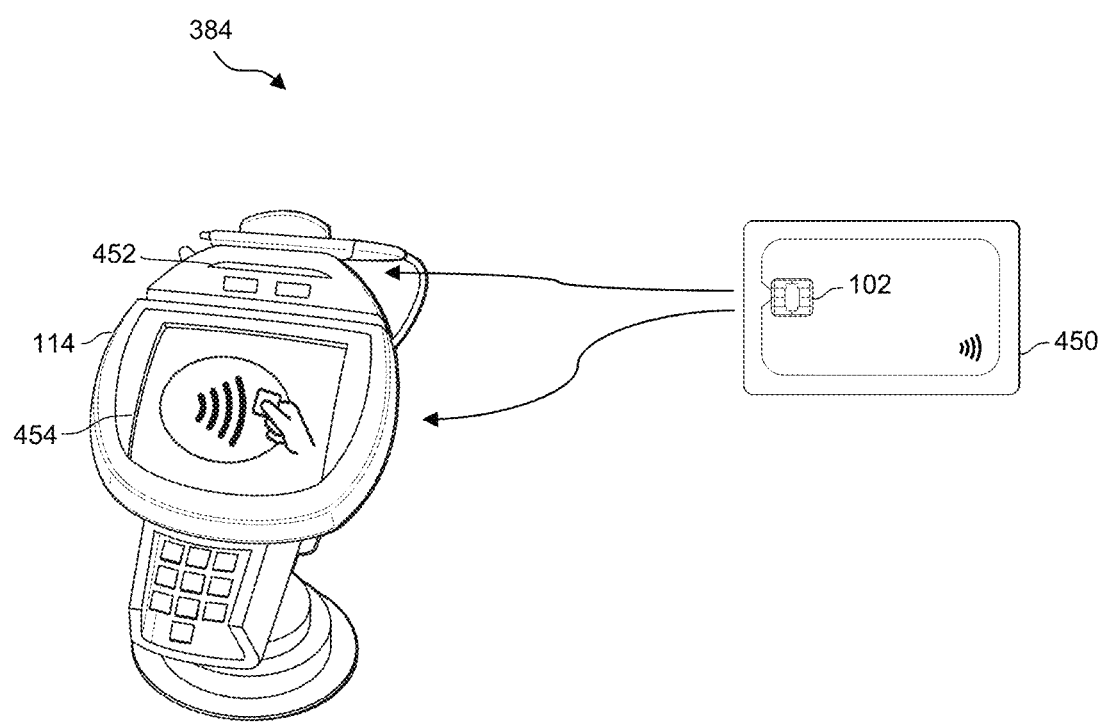
Figure 16A:
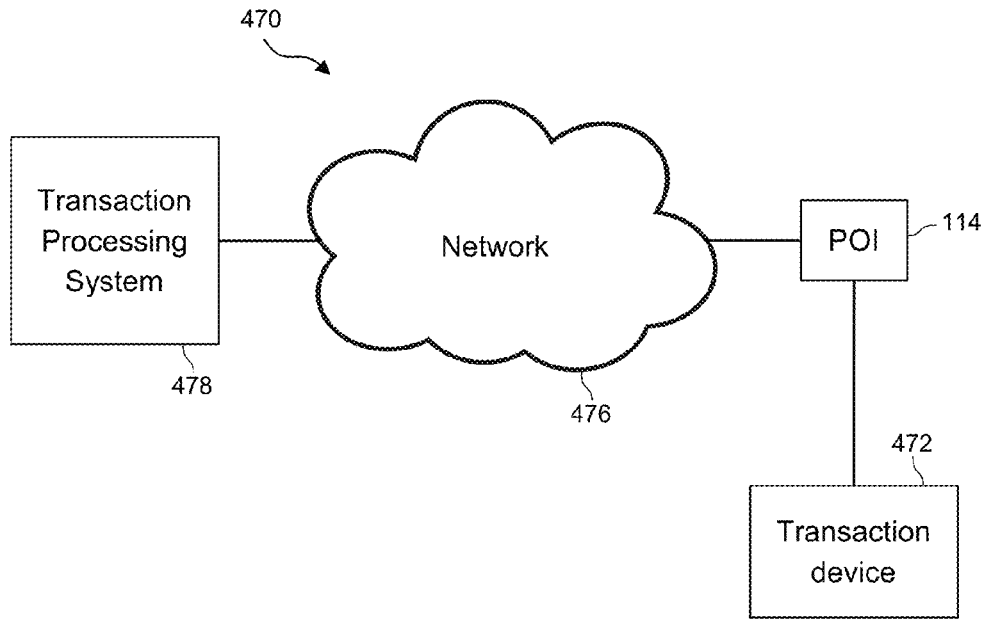
Figure 17A:
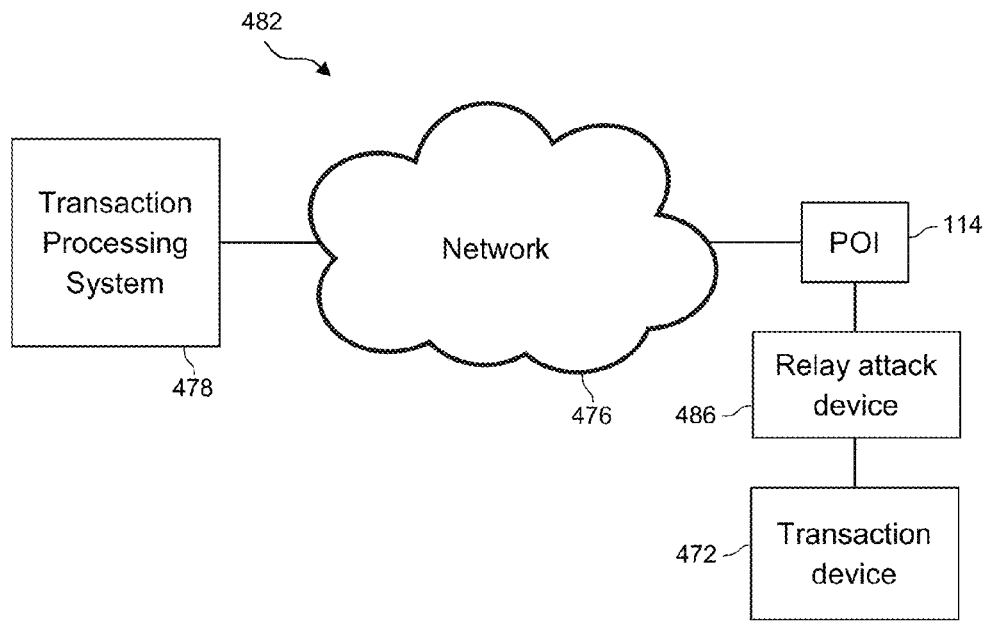
Figure 18:
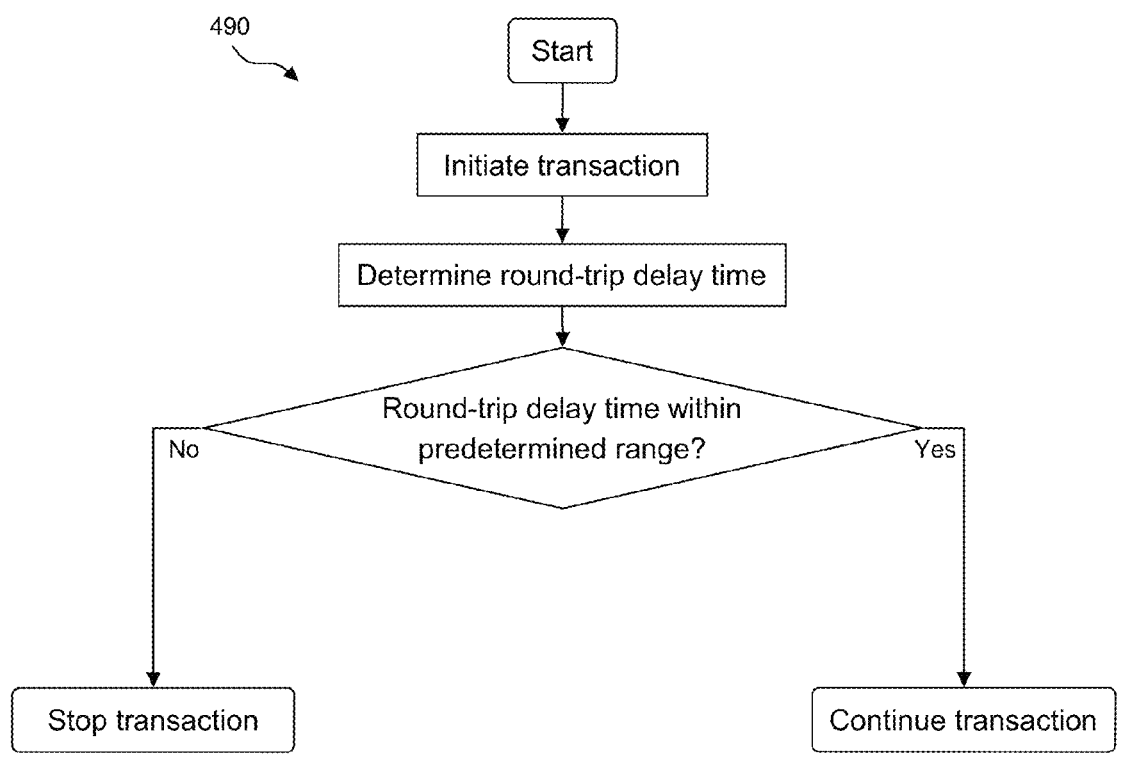
Figure 19:
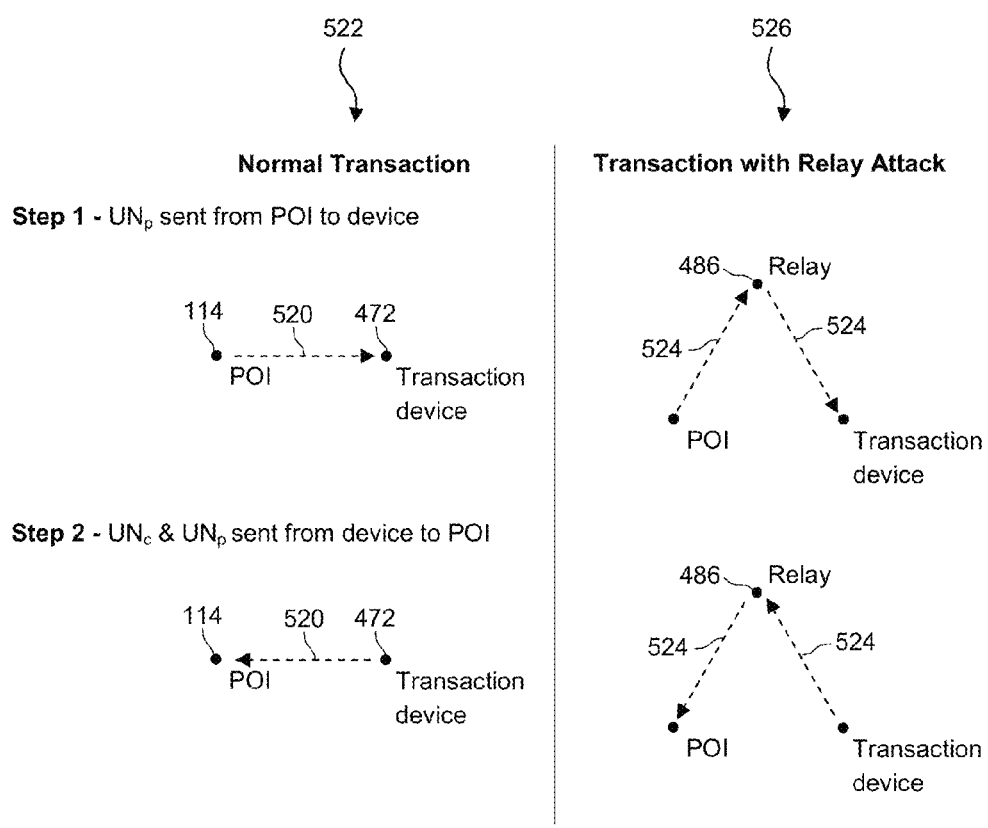
Figure 20:
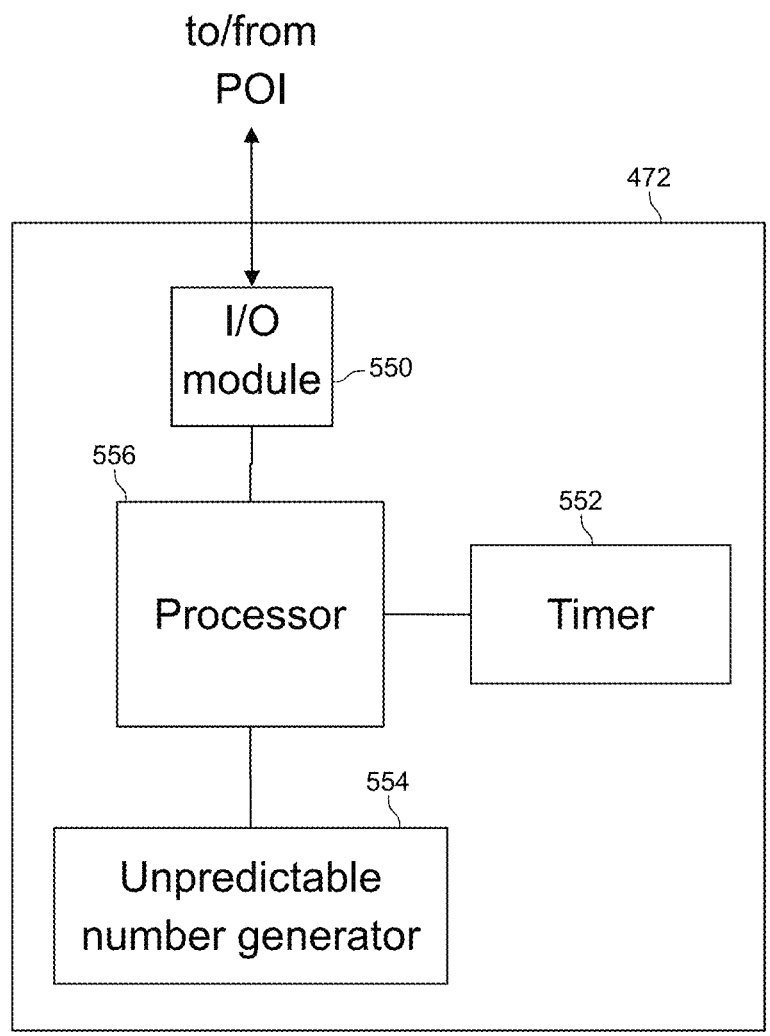
Figure 21:
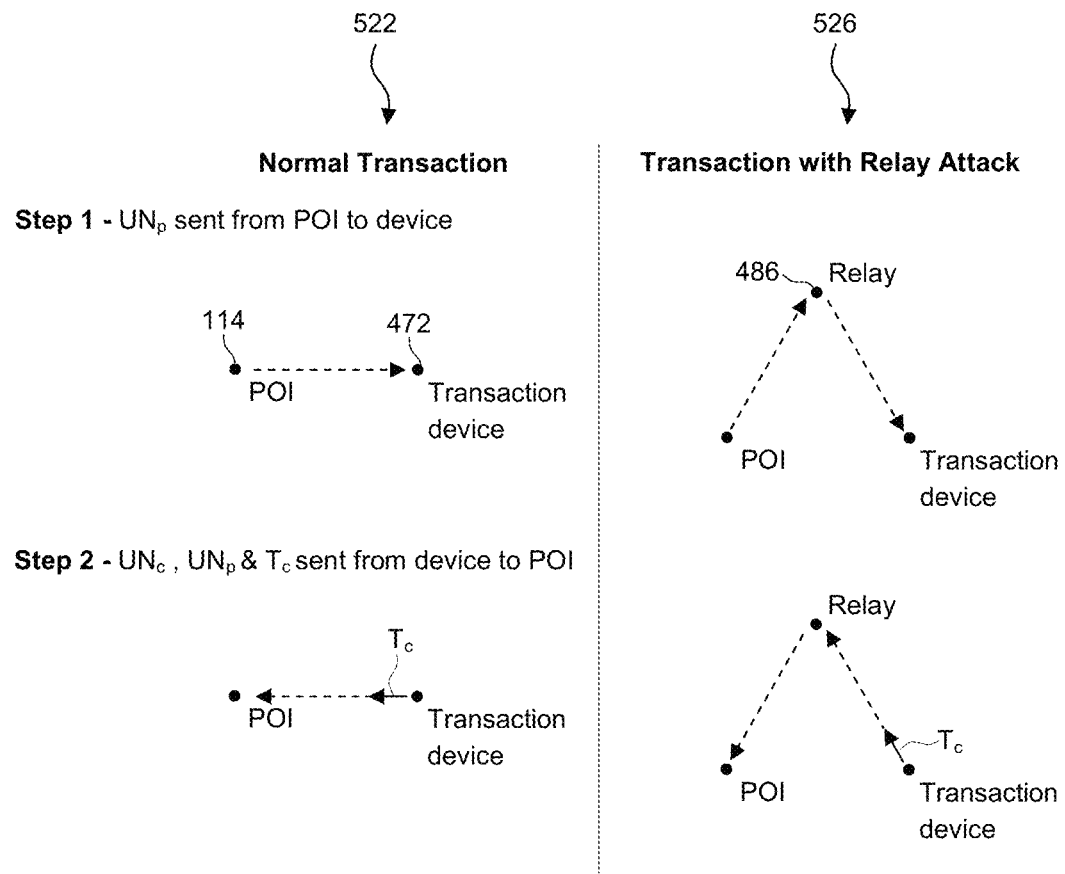
Figure 22:
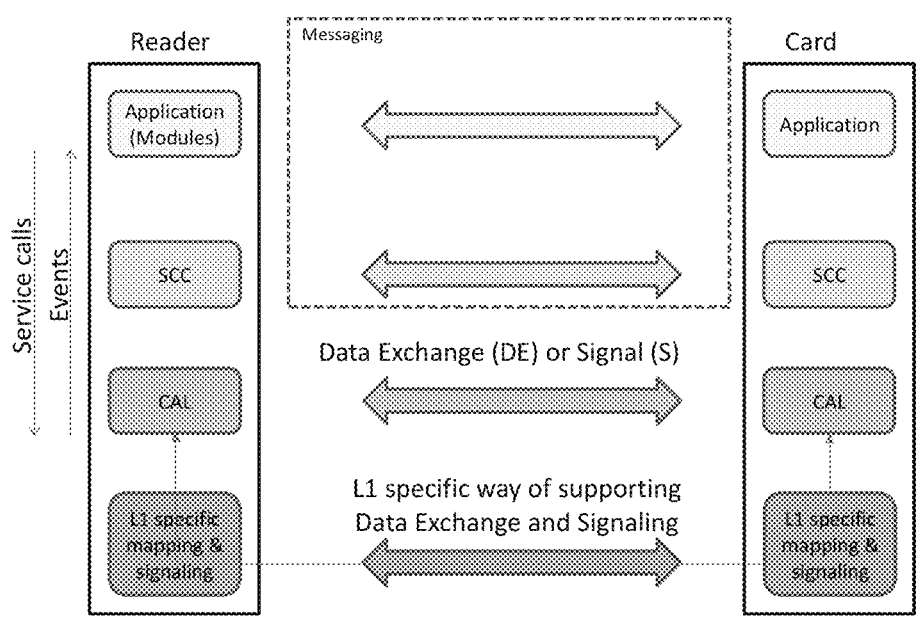
Figure 23:
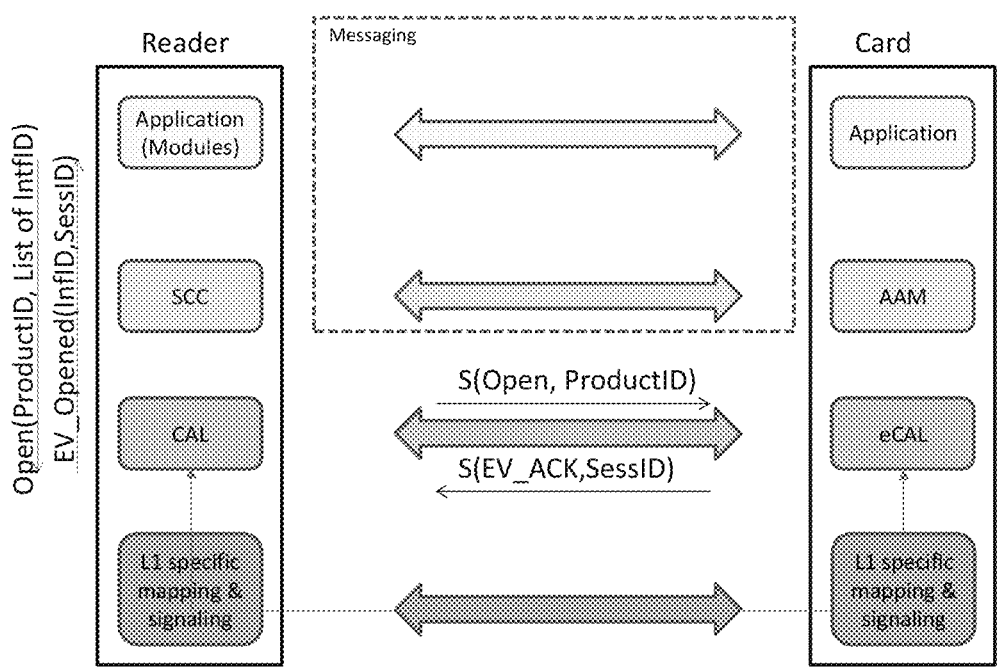
Figure 24:
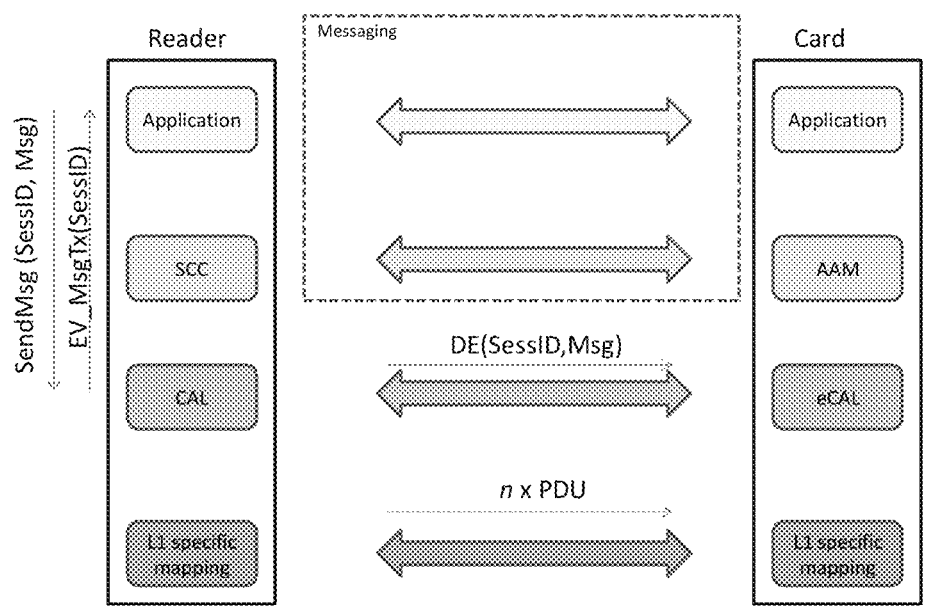
Figure 25:
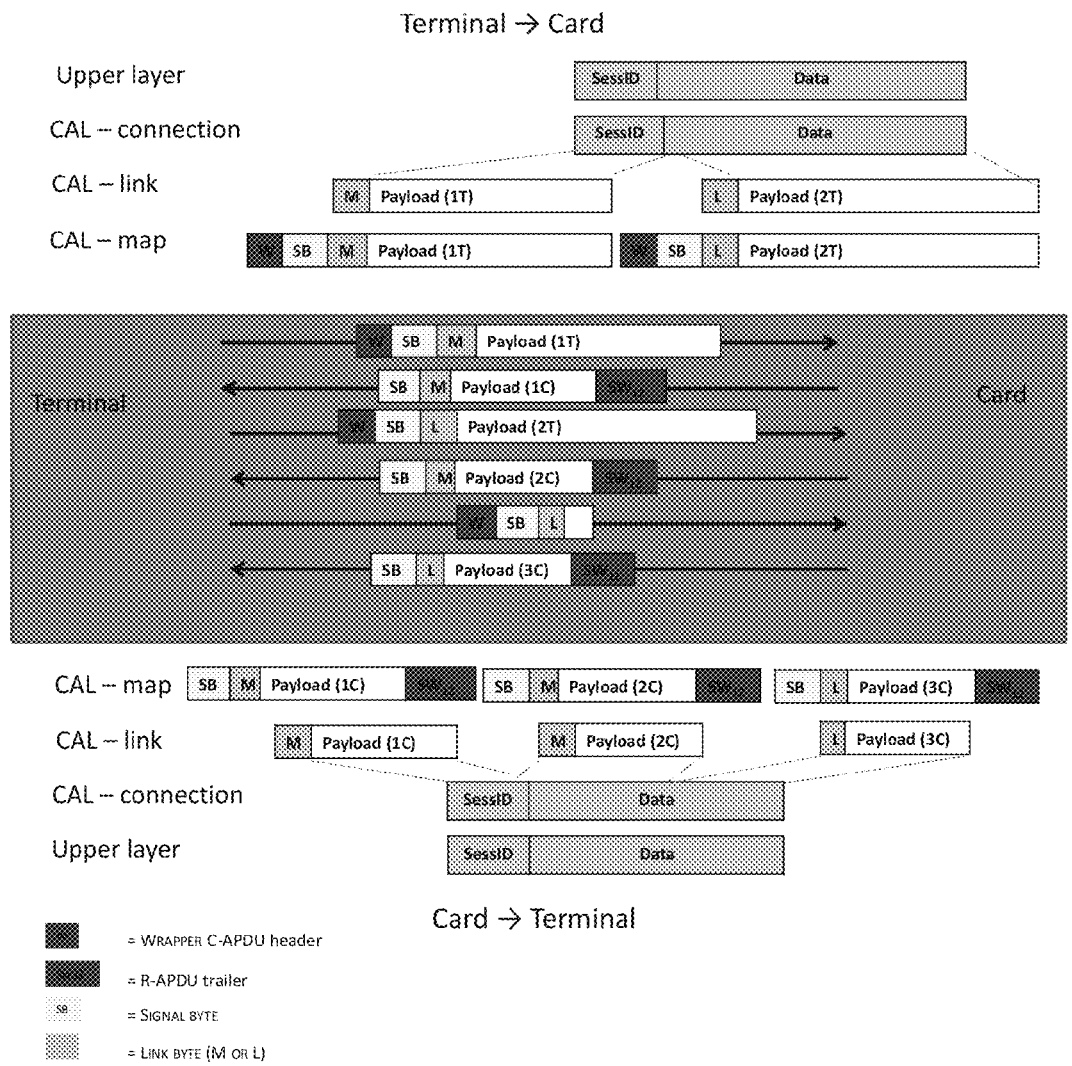
Figure 26:
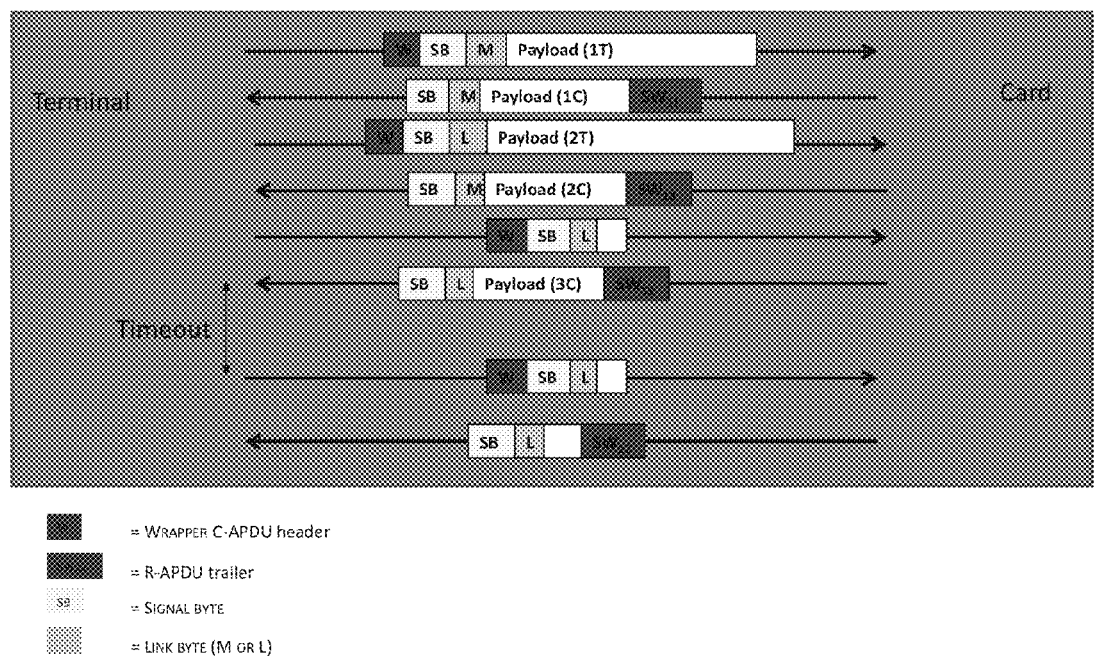

FIG. 11 is a flowchart of a process of carrying out a payment transaction according to an embodiment of the disclosure;

FIG. 12 is a representation showing a prior art derivation of a shared secret between two parties;

FIG. 13 is a flowchart of processes carried out by a POI and a transaction device according to an embodiment of the disclosure;

FIG. 14 is a dataflow between a POI and a transaction device according to an embodiment of the disclosure;

FIG. 15 is a schematic diagram of a POI and a transaction device;

FIGS. 16(a) and (b) are schematic block diagrams of normal environments in which a POI and a transaction device operate;

FIGS. 17(a) and (b) are schematic block diagrams of environments in which a POI and a transaction device operate with a relay attack;

FIG. 18 is a flowchart of the prior art process of determining whether a relay attack is occurring in a payment transaction;

FIG. 19 is an illustration of communication paths in a normal transaction and a transaction with a relay attack;

FIG. 20 is a schematic block diagram of a transaction device according to an embodiment of the disclosure;

FIG. 21 is an illustration of communication paths in a normal transaction and a transaction with a relay attack according to an embodiment of the disclosure;

FIG. 22 is a schematic block diagram of a Session Management Utility;

FIG. 23 is a schematic block diagram of a Session Management Utility with an Open CAL Signal;

FIG. 24 is a schematic block diagram of a Session Management Utility with a SendMsg CAL Data Exchange;

FIG. 25 is a schematic block diagram of Protocol Data Unit serialization for ISO 7816-4;

FIG. 26 is a schematic block diagram of Asynchronous Balanced Mode; and

Figure 27:
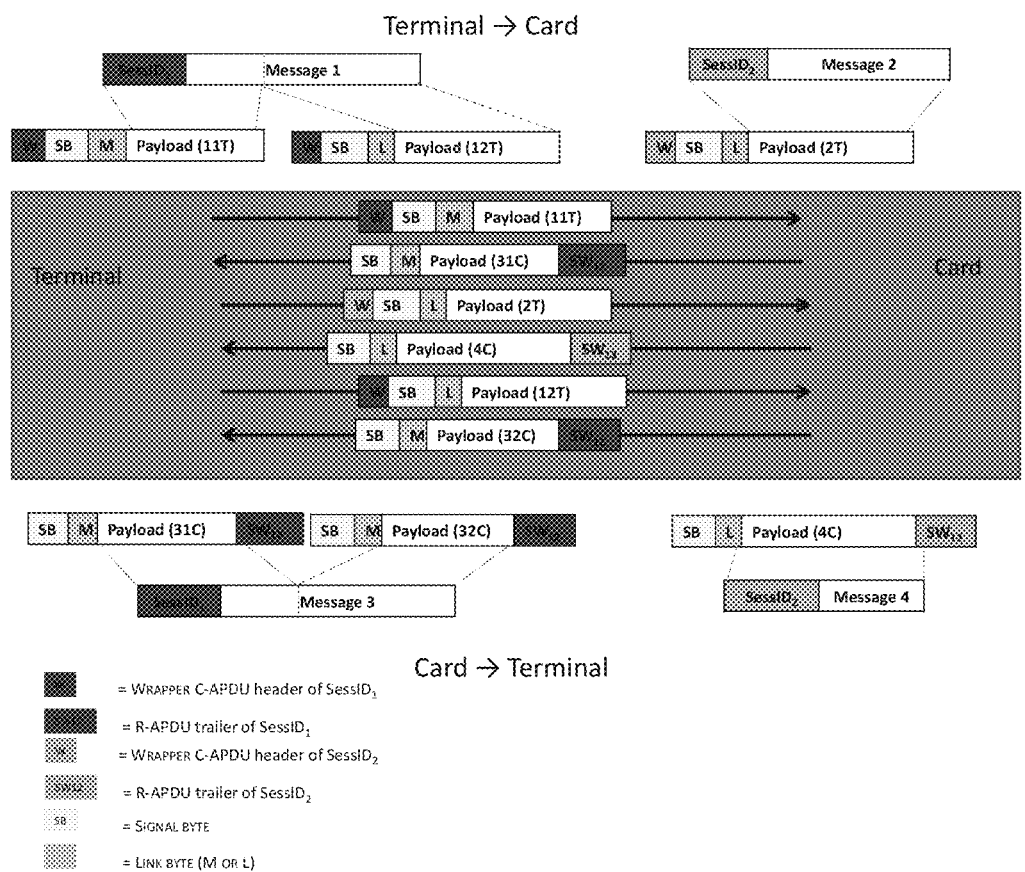

FIG. 27 is a schematic block diagram of multiple sessions and channels.

DETAILED DESCRIPTION

In the following description the transaction device is a payer device that may take many forms, e.g. a smartcard or another form factor like a mobile communications device, keyfob, etc. The functional blocks that make up a transaction device may be distributed; so part or all of the device may be implemented in the cloud.

The Point of Interaction (POI) is a merchant device that may take many forms: dedicated merchant terminal device, mobile phone, internet server.

Transaction Device Architecture

Figure 1A:
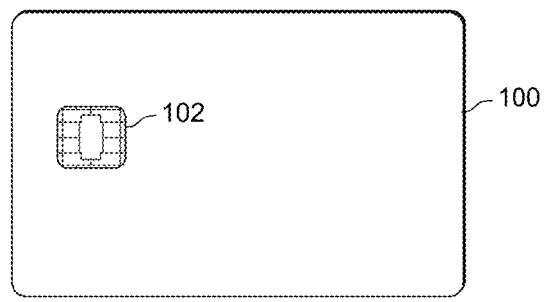
FIG. 1(a) is a schematic block diagram of a transaction device comprising an integrated circuit chip.
Figure 1B:
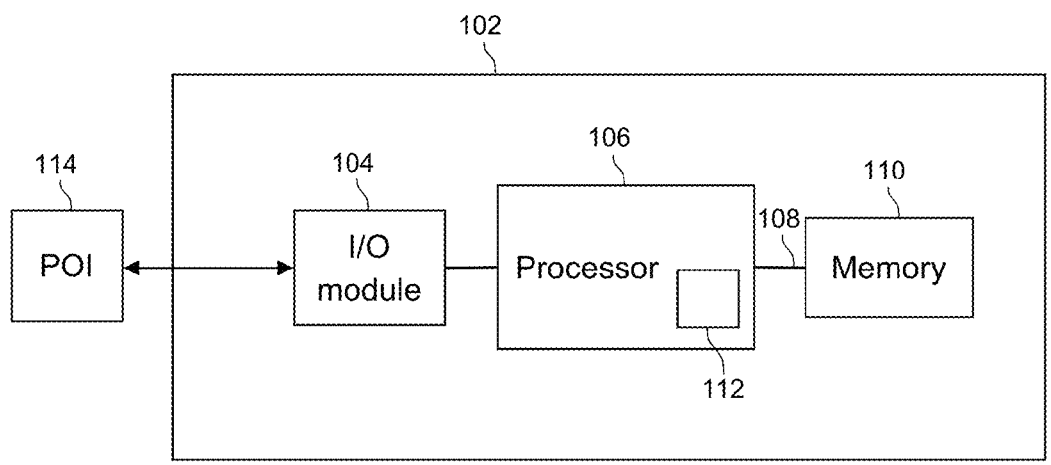
FIG. 1(b) is a schematic block diagram of the integrated circuit chip of FIG. 1(a)

A schematic of a transaction device in accordance with embodiments of the present disclosure is shown in FIGS. 1(a) and 1(b).

In FIG. 1(a), a bank payment card 100 is shown, the card 100 comprising an integrated circuit element or transaction device 102. It is noted that although the transaction device 102 is shown embodied in a payment card 100 here and in the following description, the transaction device 102 may be embodied in alternative configurations, e.g. within a mobile telecommunications device or a SIM module within a mobile device.

The transaction device 102 is shown in further detail in FIG. 1(b) and is seen to comprise an input/output arrangement 104, a processor 106, a communications connection 108 to one or more memory devices 110 and a secure element 112.

The secure element 112 is a secure memory and execution environment in which application code and application data may be securely stored. The secure element 112 also provides an environment within which applications can be run and encryption, decryption and signature functions can be performed. The secure element 112 may be implemented by a separate secure circuit within the integrated circuit or in a mobile device environment may be embedded within a SIM card or a memory storage card that may be inserted into the mobile device. The secure element 112 may also be used to store financial or user data.

Figure 2:
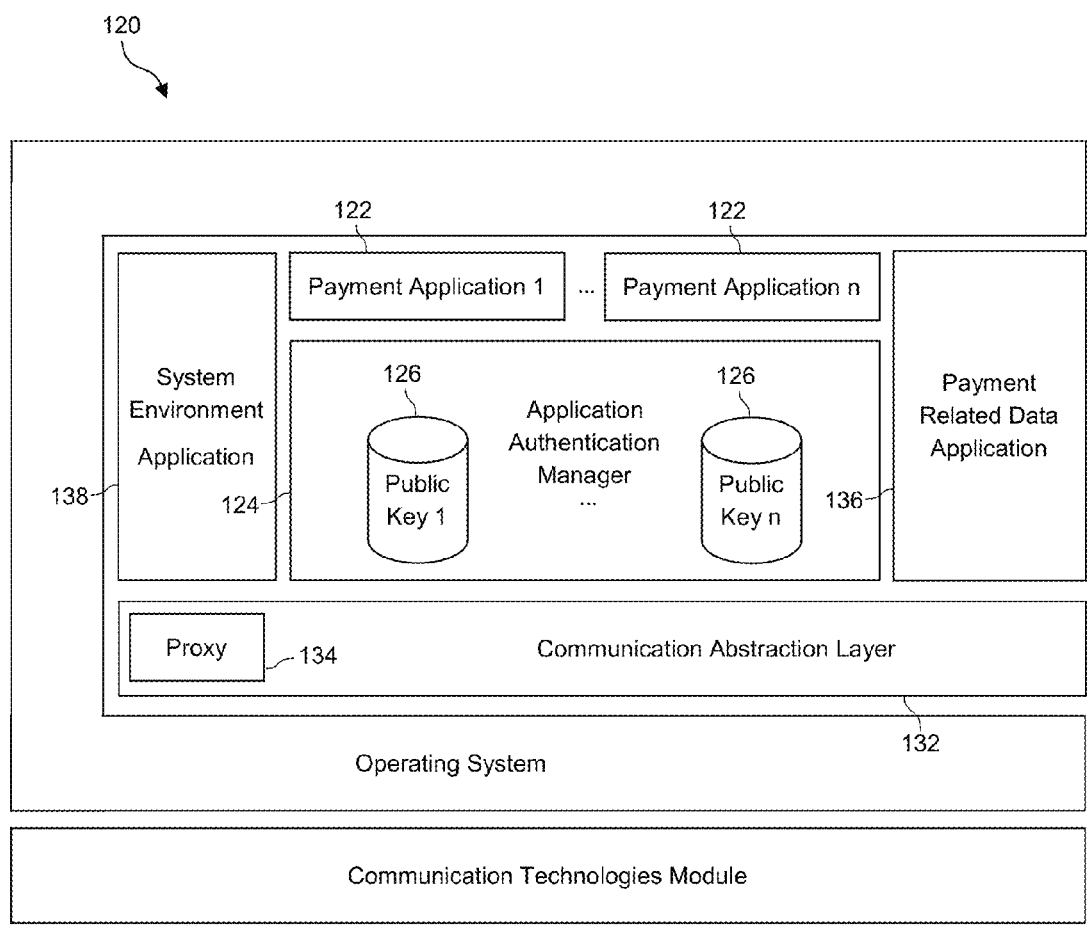
FIG. 2 is a schematic block diagram of the modules in the transaction device of FIG. 1(a) according to an embodiment of the disclosure.

A transaction device 102 according to an embodiment of the present disclosure comprises a plurality of modules to carry out required payment transaction tasks with a point of interaction (POI) 114 such as a payment terminal is shown in FIG. 2. FIG. 2 represents an example layout 120 of modules in a transaction device 102.

In the example layout 120 of FIG. 2, the transaction device 102 comprises a plurality of payment applications 122 that exist inside a secure element 112, each of which may use different payment protocols. It is noted that only one payment application 122 and its corresponding payment protocol is required to complete a payment transaction. The POI 114 can typically accept a plurality of different payment protocols, however, there may only be one common payment protocol used for a transaction between the plurality of payment applications 122 on the transaction device 102 and the POI 114.

Another example of a module on the transaction device is an application authentication manager (AAM) 124. The application authentication manager module 124 is configured to establish secure channels between the transaction device 102 and the POI 114, and comprises algorithms, keys 126 and public key certificates to encrypt the data exchanged between them. In the arrangement shown in FIG. 2 the AAM module 124 is shared between the various payment applications 122. In an alternative arrangement 130 (see FIG. 3), each payment application 122 may have its own application authentication manager 124.

It is noted that in current electronic authorisation systems payment applications contain their own version of AAM type logic and there is no separate AAM module 124 as in FIG. 2 above. In current systems therefore there is no capability to share AAM functionality.

The plurality of different payment applications 122 may format their inputs and outputs differently to each other. In this case, a further module may be configured to standardise inputs and outputs from the payment applications to conform with ISO 7816-4 related to electronic smart cards with integrated circuit chips. This module is referred to as the communication abstraction layer 132 in FIGS. 2 and 3 above.

The communication abstraction layer 132 of the transaction device 102 may further comprise a proxy 134 to form an extended communication abstraction layer (eCAL). The transaction device 102 may be configured to interact with POIs 114 through one of a plurality of communication protocols, non-limiting examples including near field communication, USB, Wi-Fi, Bluetooth and mobile data services (e.g. GPRS, 3G, LTE). Communications sent to/from the transaction device 102 to/from the POI 114 via these communications protocols may be mapped by the proxy 134 to/from the ISO 7816-4 standard. The communication abstraction layer 132 in turn may convert the communications for the payment application. In alternative embodiments, communications sent to/from the transaction device 102 to/from the POI 114 may be mapped directly to the payment applications by the communications abstraction layer 132 without the proxy.

Figure 3:
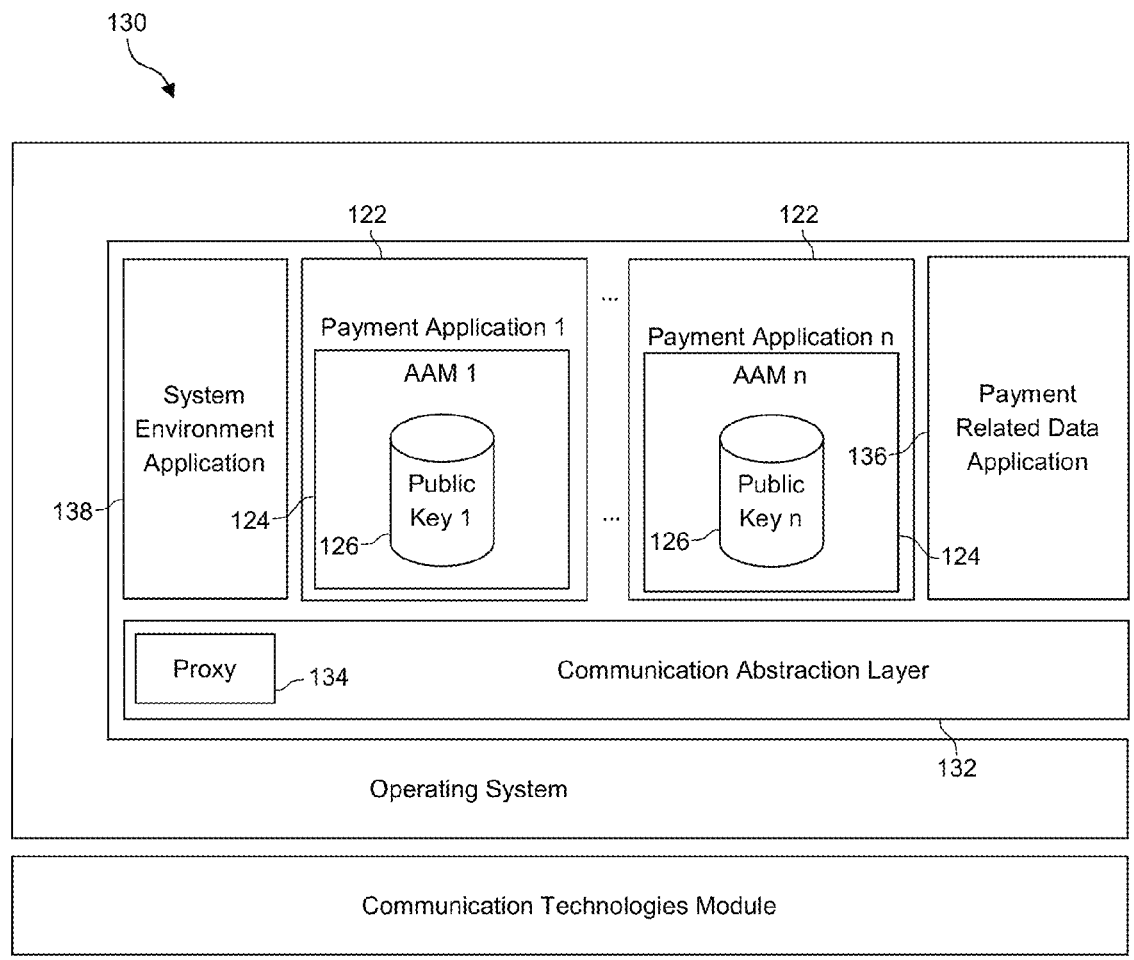
FIG. 3 is a schematic block diagram of the modules in the transaction device of FIG. 1(a) according to another embodiment of the disclosure.

As well as a payment application 122, the arrangements 120, 130 of FIGS. 2 and 3 respectively each comprise a payment related data application 136 which may be arranged to manage non secure aspects of payment transaction, for example loyalty points, offers and discount vouchers. The payment related data application 136 may be operably connected to the payment application 122. The payment related data application 136 may also communicate with the POI 114 directly and/or via the payment application 122.

The system environment application 138 shown in the arrangement of FIG. 2 (and FIG. 3) determines the list of payment applications 122 that may be eligible for a particular transaction on the transaction device 102. For this purpose, it compares the transaction information (e.g. transaction value, currency code, transaction type) and POI capabilities (e.g. PIN pad, biometric scanners, offline/online verification) received from the POI 114 against the requirements and preferences of the various payment applications 122 on the transaction device 102.

For payment application selection, a service identifier list may be established by the system environment application 138. The system environment application 138 may be configured to establish its service identifier list in one of three ways:

1. Static—the system environment application 138 is hard coded with different service identifier list that it sends to the POI 114 based on the transaction type. The benefit of this solution is that it is fast. However, it is not fully accurate as, for example, a payment application 122 that has been blocked would still be presented.

2. Shared memory between the system environment application 138 and payment applications 122—the system environment application 138 may obtain information from the payment applications 122 (e.g. availability and/or requirements) and compiles the service identifier list.

3. Application programming interface—the payment applications 122 are configured with interface protocols that the system environment application 138 accesses to obtain desired information. The system environment application 138 may use this interface to provide details about the transaction to the payment applications (e.g. transaction value, currency code, transaction type) and retrieve the application properties. Using this method, the list of applications may be built dynamically and takes into account transaction details or any payment application internal status.

The dynamic methods 2 and 3 above could be executed only once or could be executed several times during application selection. The system environment application 138 would feed the different payment applications 122 with information received from the POI 114, thus allowing the transaction device 102 to adjust its availability and requirements and to ask for additional data—by means of a Kernel Data Identifier List (discussed later). For applications that require additional data, the system environment application 138 would compile the various requests into one consolidated Kernel Data Identifier List per message it sends to the POI 114.

Payment applications 122 and the system environment application 138 may exist either on the same integrated circuit chip or on separate integrated circuit chips. Further, by separating the system environment application 138 and the payment applications 122 onto different integrated circuit chips, it simplifies the ability to change the configuration of the system environment. For example, if the transaction device 102 was a mobile phone, then the system environment 138 could be run from the main processor of the mobile phone which would be faster than the secure element of the mobile phone containing the payment applications.

Similar to the system environment application 138 collecting information from the different payment applications 122, a payment application 122 may collect information from one of more payment related data applications 136 in one of three ways:

1. Static—the payment applications 122 is hard coded with payment related data.

2. Shared memory between the payment related data application 136 and payment applications 122—the payment applications 122 may obtain information from the payment related data application 136 (e.g. features and/or requirements).

3. Application programming interface—the payment related data application 136 may be configured with interface protocols that the payment applications 122 access to obtain desired information. The payment applications 122 may use this interface to provide details about the transaction to the payment related data application(s) 136 and retrieve the application(s) properties. Using this method, the payment related data can be built dynamically and take into account transaction details or any payment application internal status.

The dynamic methods 2 and 3 above could be executed only once or could be executed several times during payment processing. The payment applications 122 would feed the payment related data application(s) 136 with information received from the POI 114 and from payment related data application(s) on the POI, thus allowing the payment related data application(s) 136 on the transaction device 102 to adjust to the current transaction and ask for additional data.

The system environment application 138, the payment applications 122, the payment related data application 136, the application authentication manager 124 and the communication abstract layer modules 132 are now described in more detail.

System Environment Application

The System Environment application module 138 may be arranged to determine the list of payment applications 122 that are eligible for a particular transaction. For this purpose, the system environment application 138 may compare the transaction information (Amount, Currency Code, Transaction Type, . . . ) and terminal capabilities (PIN, offline/online, . . . ) received from the POI 114 against the requirements and preferences of the various payment applications on the transaction device 102.

Each payment application 122 on the transaction device 102 has its requirements and preferences on cardholder verification (methods), authorization (methods: online and/or offline) and additional services that are directly (cash advance, currency conversion, . . . ) or indirectly (loyalty, coupons, ticketing, . . . ) linked to the payment application 122.

The system environment application 138 does not contain secrets (PIN, keys, . . . ) so that there are no requirements for (hardware) protection to ensure confidentiality. It is expected that common operating systems may guarantee the requirements on integrity—so the system environment application 138 may be implemented in regular microcontrollers. This includes smart cards but also the main processor of mobile phones and PCs.

On a multi-application transaction device 102, the system environment module 138 is the point of entry for service discovery. The system environment module 138 is called before the transaction takes place and gathers, from all other modules/applications on the transaction device, their disposition about the transaction. The disposition can be one or more of:

Can process the transaction,
Cannot process the transaction,
Can offer additional services for this transaction (e.g. couponing, cash back allowed . . . ),
Is a member of a "club" (meaning the cardholder has membership in a special deal with certain merchants/acquirers)

The above functionality allows different usable payment (and other) applications on the transaction device 102 to be offered to a transaction device user based on the transaction details given by the point of interaction 114.

The system environment module 138, when triggered, gathers from all modules/applications on the transaction device, both the services that can be offered and the requirements for the transaction (e.g. requirements in terms of CVM, transaction processing: online only, offline only, . . . , availability for this transaction, . . . ).

This functionality allows offering to the cardholder the best options for the transaction. The cardholder will be presented with a list of potential products, dynamically updated, that can be used for the transaction, along with the additional services per product.

For each application on the transaction device, the system environment module may retrieve:

Whether the application is available for the transaction
Whether the application has specific requirements for the transaction, in terms of CVM or authorization mode (e.g. offline only or online only).
Whether additional services may be offered (e.g. cashback)
Whether the application supports PRD
The type of application (legacy application or payment application 122).

The collection of this information from payment applications 122 can be done in different ways as described above.

Payment Application

A payment application 122 is a card application that can transact with a POI 114. Different payment systems may each develop their own version of a payment application 122.

A payment application 122 may be identified and accessed through a Service Identifier (SvID) and may comprise software (in permanent or non-volatile memory), configuration data (in non-volatile memory) and transaction data (in volatile memory). A payment application 122 may be implemented as a state machine.

In most cases, a payment application 122 will contain secrets (secret and/or private keys) and resources (PIN, counters, . . . ) that require a level of hardware protection (for integrity and/or confidentiality). A payment application 122 may be implemented in full or partially in what is commonly referred to as a Secure Element 112. The secure element 112 may be a smartcard, a UICC, an embedded Secure Element, SD card (Secure Digital).

Parts of a payment application 122 may be implemented remotely from the terminal or Point of Interaction (POI) 114 and may only expose a communication interface at the POI 114 and have all other functionality implemented remotely.

It is noted that the system environment application 138 and payment applications 122 may run from different microcontrollers and a transaction device 102 may be an integrated system or a distributed system.

The payment application 122 may support several functional blocks, such as:
 "Cardholder verification"
 Authorization
 Payment Related Data (PRD)

Cardholder verification is a mechanism that allows the transaction device to request various forms of cardholder verification (CV) in sequence. Cardholder verification data are captured on the point of interaction device or on the transaction device (e.g. on a mobile phone) and may be verified by the transaction device 102 or with the help of the issuer of the transaction device if there is an online message or by the merchant.

Cardholder verification methods can be for instance:
 Offline PIN (verified by the transaction device),
 Online PIN (verified by the issuer)
 Signature (verified by the merchant)
 Match-on-card biometrics (e.g. fingerprints verified by the card), The cardholder verification mechanism may be based on the exchange of the following data in messages:

Card requested CVM: the transaction device 102 requests that a certain form of CV data be captured on the point of interaction and that the corresponding CVM be processed (e.g. offline PIN capture to send to transaction device, online PIN capture to send to the issuer).

Terminal CVM status: the point of interaction 114 informs the transaction device 102 on the status of the attempted CVM on the point of interaction (e.g. offline PIN captured and thus provided to transaction device, PIN unknown to the cardholder and so PIN entry has been by-passed, online PIN captured and thus prepared to be sent to the issuer, fingerprints could not be captured, signature on receipt will be verified by merchant,).

Transaction device CVM status: the transaction device 102 informs the point of interaction on the status of the attempted CVM on the transaction device 102 (e.g. offline PIN correct, offline PIN not correct, fingerprints verification successful, PIN captured on mobile phone and successfully verified).

In consecutive messages between the transaction device 102 and the point of interaction 114, the data above are exchanged until both the transaction device 102 and the point of interaction 114 agree that the CV has been successfully done or not. This allows the transaction device 102 and the POI 114 to combine different CVMs (for instance the transaction device 102 may first request offline PIN to be done and then on top request signature to be done). It also allows the transaction device 102 to dynamically adapt its requests based on the information from the point of interaction (e.g. if fingerprints could not be captured then ask signature).

CRM—Authorization is a mechanism that allows a transaction device application to accept the transaction offline, request online authorization or decline offline.

The decision process may take into account:
 various point of interaction parameters (e.g. transaction details and terminal dispositions for the transaction)
 transaction device application internal parameters (e.g. offline counters)
 the outcome of the CVM processing
 PRD processing.

In some transaction device applications, the logic used for the decision process may be very simple. This would be the case typically for online only applications. Other transaction device applications may use a complex logic to take the decision.

The transaction device application may compute a cryptogram for each of the 3 outcomes (decline, online, offline). This cryptogram may be verified by the issuer of the transaction device. Some transaction device applications may need first to decide on the authorization before delivering the cryptogram. Other transaction device applications may deliver the cryptogram very early in the transaction and would let the point of interaction use that cryptogram for different outcomes.

When an online authorization cryptogram has been delivered, some transaction device applications may not require to remain in communication with the point of interaction and this would be indicated. The transaction device 102 can then be removed. Other transaction device applications may need to remain in communication with the point of interaction 114. For instance:
 to complete CVM processing after online authorization
 to process issuer required actions indicated in the online response.

Legacy Payment Application

A Legacy Application (LegApp) is a card application that can transact with an EMV 4.3 (contact) kernel or any of the C-x (contactless) kernels listed on the EMVCo website (http://www.emvco.com/). Examples of legacy applications are CPA, M/Chip Advance, PayPass-M-Chip, VSDC, qVSDC etc.

Payment Related Data Application

The transaction device 102 may comprise a payment related data application module 136 that is arranged to manage payment related data—such as loyalty, couponing, ticketing—that interfaces with a one or more payment applications 122 on the transaction device 102.

The payment related data application module 136 may communicate with the POI 114 directly, use a payment application 122 to communicate with the POI 114 or use a combination of both. If a payment related data application module 136 is running in parallel with a payment application module 122 and communicating with the POI 114, then it could use the communication services of the extended communication abstraction layer 132.

Application Authentication Manager

The Application Authentication Manager (AAM) module 124 is a functional block or software component in the transaction device 102 that payment applications 122 may use to set up a session key with the Secure Card Channel Manager (SCC Manager) in the POI 114 and authenticate this session key towards the POI. The AAM 124 and SCC Manager use this session key to protect (for authenticity, integrity and confidentiality) the data exchanged between transaction device 102 and POI 114.

For this purpose, the AAM 124 may be a single software module (i.e. a library) on the transaction device 102 that is accessible by the various payment applications 122 (see the layout 120 of FIG. 2) or may be embedded in each payment application 122 on the transaction device 102 (see the layout 130 of FIG. 3).

For each payment application 122 that would like the session key to be authenticated, these applications will provide AAM 124 with the public and private ECC keypair (denoted as 126 in FIG. 2. It is noted that for legibility feature 126 refers to only to public keys in FIG. 2. It however be appreciated that feature 126 should be read as public and private key). This can be achieved by personalizing this key pair into AAM 124 or providing AAM with the key pair through some (proprietary) API.

If a transaction is done with a payment application that has (registered) an ECC keypair, then the AAM 124 may calculate a blinding factor and use the blinded public key (rQC) as input for the session key derivation.

If the selected payment application 122 has no ECC keypair (registered), then the AAM 124 may calculate a random number X to compute an ephemeral public key $Q_c$ and use this key as material for the session key derivation. Either $rQ_c$ or $Q_c$ may be sent to the POI 114 (as the key is ephemeral, tracking is not possible and blinding with r is not necessary).

Extended Communication Abstraction Layer (eCAL)

A transaction device 102 may expose one or more communication interfaces towards the POI 114, e.g. contact, contactless, USB, Wifi, Bluetooth, GPRS etc. To make the payment application modules independent of the communication layer, the transaction device 102 may include a communication abstraction layer 132.

Depending on the interface selected for completing a transactions, messages exchanged with a POI 114 by the system environment application module 138 and payment application modules 122 may be mapped to 7816-4 (for contact, contactless), to TCP (for Wifi, Bluetooth) or to other protocols.

The functional blocks in the transaction device may use different interfaces for communication. When the POI 114 is interacting with the system environment application module 138 over Bluetooth, mapping of messages in the POI 114 and the transaction device 102 may well be the same: both the POI 114 and the transaction device 102 map the message for application selection onto Bluetooth. When the POI 114 is then interacting with the payment application 122, the POI 114 may map the messages to Bluetooth. In the transaction device 102, these messages are received on Bluetooth (e.g. in the main processor). Within the transaction device 102, the proxy 134 may map the messages received over Bluetooth onto 7816-4, for sending them to the payment application residing on a secure element.

Figure 4:
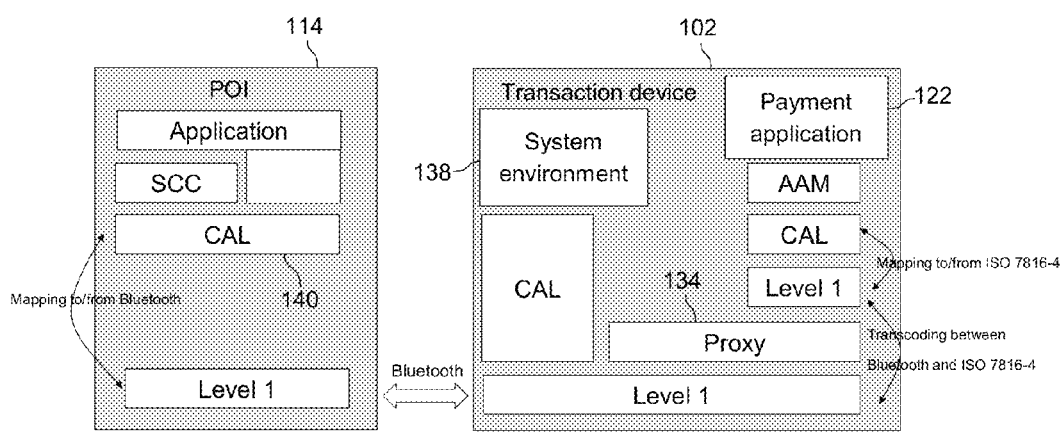
FIG. 4 is a schematic block diagram of a POI and a transaction device shown in communication with each other.

FIG. 4 describes a transaction device 102 in communication with a POI 114 via Bluetooth that implements the arrangement described above.

It is noted that the functionality of the eCAL is broadly equivalent to the functionality of a communication abstraction layer 132 within the point of interaction.

Since the eCAL module within the transaction device 102 is broadly equivalent to the Communication Abstraction Layer (CAL) 140 of the POI 114, the eCAL module 132 within the transaction device 102 may provide the following services related to the communication with the transaction device:

Establishing and managing Level 1 communications session

Mapping Level 2 (application layer) messages onto a Level 1 (transport layer) protocol ('binding')

It is noted that as part of Level 1 (L1) connection management, the CAL 140 within the point of interaction 114 is responsible for:

Establishing, maintaining, and terminating a connection with the transaction device 102

Managing the interaction with the payment application 122 as a session, including opening, pausing, resuming, and closing the application through a signalling protocol Within a session, allowing the exchange of messages Once the session has been opened and a link has been set up, enabling either side of the link to initiate transmission of messages Allowing several payment applications 122—and therefore multiple sessions—to run in parallel The purpose of building in an explicit binding is to make the payment application 122 independent from the communication layer, so that the payment application can be L1 agnostic.

It is assumed that the communication abstraction layer module 132 on the transaction device will only need to bind to Level 1 lower layers that provide a reliable communication protocol (ISO 7816-4, TCP, . . . )—so that CAL does not need to provide a communication error detection and recovery mechanism.

For Level 1 connection management, the CAL makes use of a Connection Management Utility, responsible for:

Activation and deactivation of one or more interfaces,

Opening and closing of channels,

Sending and receiving PDUs, and

Transaction device removal

Providing a symmetry mechanism so that payment applications may send messages at any time (ABM=Asynchronous Balanced Mode . . . )

a Link Management Utility, responsible for:

Disassembly of messages from the upper layer into a series of L1 PDUs

Assembly of L1 PDUs into messages for the upper layer a Session Management Utility, allowing several payment applications—and therefore multiple sessions—to run in parallel opening, suspending, resuming, and closing a session.

A Message Mapping Utility plugs the Connection Management Utility, Link Management Utility, and Session Management Utility onto an existing Level 1 protocol, such as ISO 7816-4.

The proxy functionality of the eCAL comprises of transcoding PDU from one technology (e.g. Bluetooth) to another technology (e.g. ISO 7816-4). This transcoding has to be applied for the connection management, the link management and the session management.

Data Exchange Between POI and Transaction Device

Figure 5:
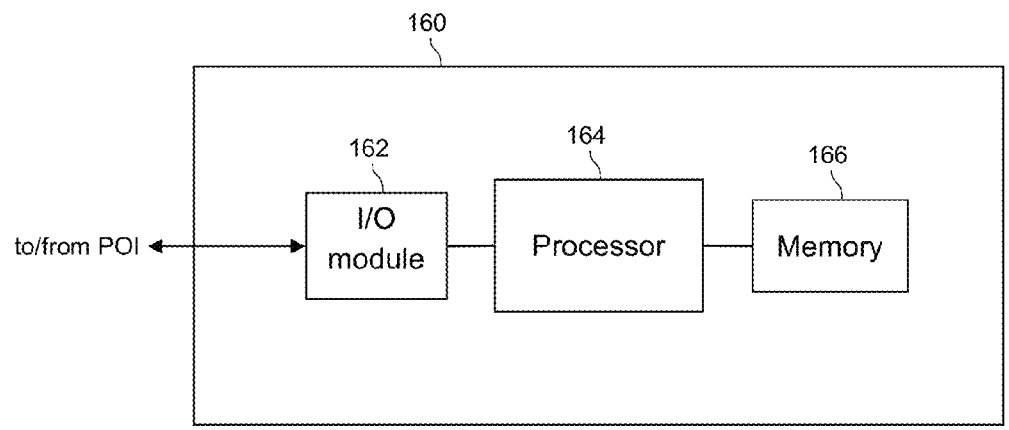
FIG. 5 is a schematic block diagram of a prior art integrated circuit chip.

In current systems, payment transactions comprise processes wherein data must be exchanged between a transaction device and a POI that are party to the payment transaction. FIG. 5 shows a general arrangement of a current transaction device 160. The transaction device comprises an input/output (I/O) module 162 and a memory 166 each connected to a processor 164. The input/output module 162 is used to perform data communications with the POI 114.

Typically, during payment transactions, the POI 114 issues requests for data (i.e. commands) to the transaction device 160. These commands are received by the input/output module 162 of the transaction device 160 and then communicated to the processor 164 for processing. The processor 164 obtains the data from the memory 166 to fulfil the command and responds to the POI 114 with the requested data. In this way, the POI 114 communicates with the transaction device 160 in a command driven approach.

Figure 6B:
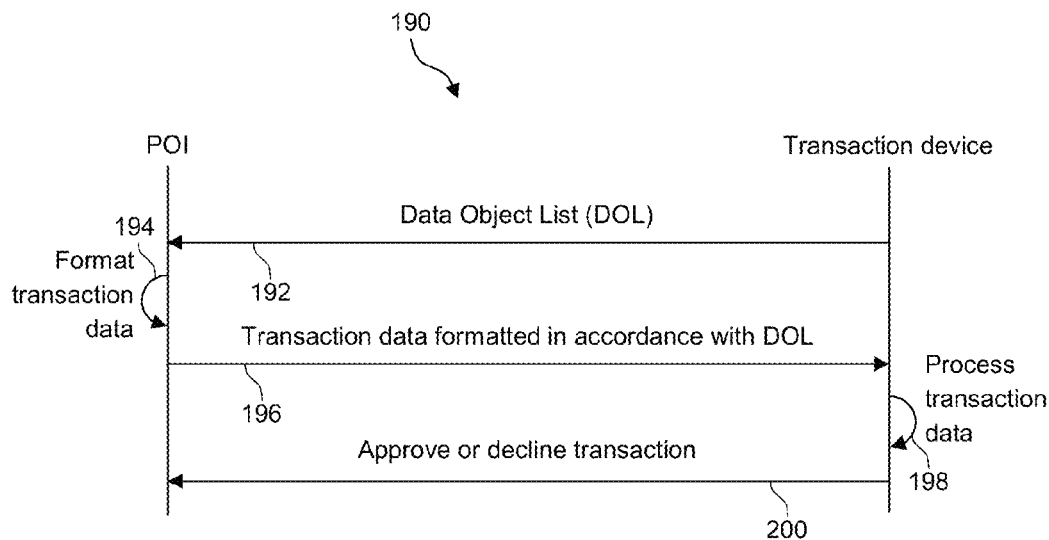

For example, the payment transaction application selection process of ISO 7816, allows the POI to define a preferred order of payment applications. As discussed above with reference to FIGS. 2 and 3, the transaction device comprises a plurality of payment applications 122. FIG. 6(*a*) shows an example data flow 180 to determine which payment application will be used for a payment transaction. Once a channel is established between the POI 114 and the transaction device 160, the POI 114 can send at step 182 an application selection command to the transaction device 160. The application selection command comprises a command that the transaction device 160 returns which payment applications are available. The transaction device 160 determines at step 184 which payment applications are available and returns a list (which can be prioritised to show the transaction device preferences) at step 186 to the POI 114. The POI determines the payment application it has in common with the transaction device that is the most preferred by the transaction device.

Further, as current transaction devices 160 do not comprise sophisticated processing capabilities, the transaction device 160 sends a Data Object List (DOL) that is stored in the memory 166 to the POI 114 during a payment transaction. As illustrated in the data flow 190 of FIG. 6(*b*), the transaction device 160 communicates at step 192 its DOL to the POI 114. The DOL is a fixed request issued by the transaction device 160 comprising instructions to the POI 114 with the syntax the transaction device requires for the transaction data. The transaction data that is formatted at step 194 in accordance with the DOL is sent at step 196 from the POI 114 to the transaction device 160. The transaction data includes objects such as a payment amount, currency and an acquirer identity.

The prior art transaction device 160 is configured to automatically process the formatted transaction data when it is received from the POI 114 without any explicit command to do so from the POI 114. The transaction data is parsed in a predetermined way by the processor 164 of the transaction device 160 to retrieve constituents of the transaction data. The transaction device 160 can then determine at step 198 whether to approve or decline a payment transaction based on whether the transaction data meets predetermined criteria. The decision of the transaction device 160 is returned at step 200 to the POI 114. However, as the DOL is a fixed list, data may be sent from the POI 114 to the transaction device 160 when parts of it may not always be required to make the decision, or other potentially useful data is omitted from the request. Additionally, the standardisation of the transaction data can result in a loss in detail in the information received by the transaction device 114.

FIG. 7 shows a transaction device 220 according to an aspect of the present disclosure. The transaction device 220 comprises an input/output (I/O) module 162, a memory 166 and a message module 222 each connected to a processor 164. The I/O module 162, the memory 166 and the processor 164 are substantially the same as in the prior art transaction device 160. The message module 222 is arranged to enable the transaction device 220 to increase control in the decisions made during the payment transaction.

In the transaction device 220 of the present embodiment, the system environment on the processor 164 is configured to communicate with the POI 114 using a data driven approach to control aspects of the payment transaction such as payment application selection. The POI 114 initiates the data driven communications with the transaction device by sending an initial set of data and a request for data which the payment device responds to. For example, this allows the transaction device 220 to negotiate with the POI 114 which payment application will be used for a payment transaction. This allows the transaction device 220 to prioritise preferred payment applications that are more secure or faster for the specific transaction (e.g. prioritize applications differently based on the amount, the terminal country code, . . . ).

In the transaction device 220 according to embodiments of the present disclosure, the payment applications of the transaction device 220 may exchange data with the POI 114 through a plurality of Messages. A Message may include a Data Identifier List (DIL) i.e. a list of data requested from the other device, as well as the data objects requested by the other device. The plurality of Messages may each have a structure comprising two parts: a DIL and the Message Data. This flexible mechanism allows both the transaction device 220 and POI 114 to choose dynamically which data they need from each other.

The DIL issued by the transaction device 220, called a Kernel Data Identifier List (KDIL), allows it to request for data to get a better view on the payment transaction and make better decisions. Using a KDIL, the transaction device 220 may request simple data objects and list of data objects, and may do so repeatedly until it has sufficient information to make a decision.

The benefit of using DILs is that the payment transaction 220 may become more secure as both the transaction device 220 as well as the POI 114 have the ability to dynamically request the specific data they need to make decisions about the payment transaction. Using DILs is also faster as only the data required for a decision are requested and communicated, whereas with a DOL all data is requested and communicated.

At the application layer of the processor 164, the transaction device 220 and the POI 114 exchange data through Messages. A Message may comprise a two part structure, including a Data Identifier List (DIL) comprising a list of data requested from the other device, as well as Message Data (the data objects requested by the other device). This flexible mechanism allows both the transaction device 220 and the POI 114 to choose dynamically which data they need from each other. FIG. 8 shows the structure of a Message 230 sent from the POI 114 to the transaction device comprising a Card Data Identifier List (CDIL). Messages from the transaction device to the POI are substantially the same with a Kernel Data Identifier List (KDIL) replacing the CDIL.

In FIG. 8, the Card Data Identifier List field (illustrated by a dashed box labelled 232) is a list of data identifiers that lists the data requested from the receiver of the message. The receiver of the Message 230 can provide the corresponding data elements in the next Message. The Data Identifier List may be empty (length is 0) if no data is requested from the receiver of the message. The following are examples of DILs that may be used during a payment transaction.

CDIL—a Message to an application on the transaction device, the purpose of this type of Message is to identify data requested by the POI from the application.

KDIL—a Message to the POI, the purpose of this type of Message is to identify data requested by the transaction device from the POI.

In FIG. 8, the message data field (illustrated by a dashed box labelled 234) contains all the data provided by the sender. These data have been requested by the receiver in the previous message. The CDIL, KDIL, message data field and individual data in the message data field are provided with an assigned identifier ($ID_{CDIL}$, $ID_{KDIL}$, $ID_{IMD}$ and $ID_x$) and length ($L_{CDIL}$, $L_{KDIL}$, $L_{MD}$, $L_x$).

FIG. 9 shows an example exchange 240 of Messages between a POI 114 and a transaction device 220.

The Messages mechanism is very flexible as it does not require predetermined logic in the message module 222 of the transaction device 220. Simple transaction devices 220 would not require many Message exchanges with the POI 114 (e.g. online only transaction devices). Using the same system, other transaction device 220 could request a lot of information from the POI 114 and the transaction devices 220 can adapt, after receiving information from the POI 114, their internal status (e.g. how much money the cardholder has spent since the last contact with the issuer) and can then decide on their next request or transaction disposition (online, approved, declined).

Lists of Data Objects

There is a significant difference between application selection and payment as far as the exchange of data objects is concerned and the impact this has on the DIL mechanism.

For the payment application, each data object generally has a unique value: currency code, acquirer ID, etc. have been determined in the application selection phase. The DILs of the payment application (of the POI and the transaction device) will ask for single data objects.

For application selection, there may be a mixture of 'lists of data objects' (e.g. a list of service identifiers (SvIDs), each SvID with its requirements on CVM, authorization) and single data objects (e.g. Country Code, Currency Code).

In the present disclosure, the data objects that exist as single data objects and the data objects that exist as lists are explicitly identified. If a data object exists as a list, it may be defined as a combined list for the transaction device (i.e for all the SvIDs of the payment applications) or as a detailed list (i.e. per SvID per payment application), with the detailed list including the dependencies on values of other data objects.

Detailed lists and the dependencies included in Messages are limited to what is common in the market. If there is a need for detailed lists or dependencies others than those specified, these can be covered through payment-related data processing.

Rules Around Messages

1. At the start of the payment application, the POI 114 has a set of default data objects that it sends to the transaction device 220 in the first message. The maximum length of this set has to be defined (in combination with the length of the CDIL).

The remainder of the message exchange is DIL driven.

2. The transaction device 220 and the POI 114 only send the data objects that are requested in the CDIL and KDIL respectively and in the order as they were requested. Transaction device 220 and POI 114 can add their KDIL and CDIL respectively before or after these data objects but not in between (i.e. cannot interleave).

3. In the first message exchange, the POI 114 and the transaction device 220 may ask for all data objects required to complete the payment transaction i.e. CDIL and KDIL of the first message exchange include the full list of data objects requested. Data objects related to CVM are a notable exception to this rule and special precautions need to be taken for CVM during the payment application—because of multiple CVMs and the possibility of human error.

4. There is a defined set of 'list of data objects' and each list exists in two flavours: a combined list and a detailed list. The detailed list includes the dependencies on other data objects.

5. For data objects that also exists as 'list of data objects' (e.g. emv.tx.AcquirerID and emv.tx.AcquirerIDList.abc—with abc equal to Combined or Detailed)

During application selection, DILs will include the identifier of the 'list of data objects' requested (e.g. emv.tx.AcquirerIDList.abc)

During payment processing, DILS will include the identifier of the 'data object' requested (e.g. emv.tx.AcquirerID).

6. A data object is either known or unknown. A known data object can have a qualifier to indicate that its final value is not decided yet.

7. If a known data object with such a qualifier is requested in a DIL, the qualifier is returned with the data object. The absence of this qualifier indicates that the value of the data object is final. Alternatively the qualifier may indicate that the value of the data object is final.

8. If a requested data object is unknown, it is returned with a length equal to zero and without qualifier (and hence value is final). Alternatively the qualifier may indicate that the value of the data object is unknown.

9. A requested data object that is not decided yet may be asked for again.

10. A requested data object that is returned with its final value must not be asked for again i.e. it must not be included in a subsequent DIL.

11. A requested object that is returned with a temporary value may be asked for again i.e. it may be included in a subsequent DIL. If not asked for in a subsequent DIL request, the data object must not be returned. Data objects that have temporary values must be known in advance by the receiver. Which data objects have a temporary value is part of the design of the payment solution and all parties must agree on them.

12. For payment processing, if the transaction device 220 and the POI 114 have agreed on online as disposition, there may be additional message exchanges to deal with the issuer blob (excluding the message exchanges required for CVM processing from this count).

Loss of Power to Transaction Device

FIGS. 10(a) and 10(b) show an example of a transaction device 260 that is embodied on a credit card style bank card 262.

The transaction device 260 comprises an integrated circuit which, in turn, comprises the architecture described above in relation to the transaction device in accordance with embodiments of the present disclosure.

It is noted that the transaction device 260 may not comprise an internal power source. In such a case during transactions power is therefore supplied from a point of interaction (POI) 114, e.g. from a card payment terminal. The supply of power may be via a plurality of contact terminals on the integrated circuit, e.g. contact points 264 in FIG. 10(a).

Alternatively, the transaction device 260 may be configured for contactless operation in which it may be brought into close proximity with a POI. In such an instance power may be derived via inductive coupling from an electromagnetic signal sent from the POI 114. In a contactless device the transaction device 260 comprises an antenna consisting of one or more wires 266 embedded within the structure of the transaction device 260. These wires 266 serve as an antenna for both communication with the POI 114 and as a power source.

An exemplary architecture within the transaction device 260 is shown in FIG. 10(b). The transaction device 260 comprises a power source module 270 (this may be in communication with the contact terminal 264 and/or the antenna arrangement 266) which is in communication with an input/output control module 272. The I/O module 272 is in turn in communication with a processor module 274 which carries the architectural components described above in relation to FIGS. 2 and 3.

The transaction device 260 may further comprise one or more memory modules. As shown in FIG. 10(b) the device comprises a random access memory (RAM) 276, a read only memory (ROM) 278 and a non-volatile memory (NVM) 280. The NVM module 280 may comprise an EEPROM module which is a memory arrangement capable of retaining stored data when power to the circuit is removed.

In accordance with an embodiment of the disclosure there is provided a method of communicating with a point of interaction 114 that mitigates against power/data loss.

Turning the process 300 of FIG. 11, in step 302, the transaction device 260 and POI 114 initiate a communication exchange. Such an exchange may be initiated on insertion of a transaction device 260 into a POI 114 device or upon the introduction of a transaction device 260 into the field of operation of a contactless payment terminal.

Initiation of the communication exchange corresponds to the supply of power to the transaction device 260 from the POI 114 via one of the methods described above.

In step 304 the transaction device 260 (the payment applications on the transaction device) may check whether there are any aborted or incomplete payments recorded within the non-volatile memory 280.

If there are no aborted or incomplete transactions detailed in the non-volatile memory 280 then the transaction device 260 moves directly to step 308.

If the transaction device 260, however, determines at step 304 that there are aborted or incomplete transactions then in step 306 it first reloads the transaction data associated with the aborted/incomplete transactions (this transaction data for a specific transaction may also be referred to as "contextual data") and then moves to step 308.

In step 308 the payment application that has been activated interacts with the point of interaction via the application authentication manager.

In the course of the transaction interaction, transaction related data is generated (step 310). Such data may comprise message exchanges, data identifying the transaction (e.g. transaction amount, transaction items, date/time data, a transaction identifier etc.)

After predetermined actions or decisions from the payment application, in step 312 the transaction data generated in step 310 is stored in the non-volatile memory 280.

Once the transaction has been completed, the transaction device 260, in step 314, clears the non-volatile memory 280 of stored transaction data.

In the event that the interaction between the transaction device 260 and the POI 114 suffers a power loss or data communication failure (event 316) then the transaction would be suspended until communication between the transaction device 260 and POI 114 was re-established.

The transaction process would in such an instance effectively return to step 302 in which the transaction device 260 and POI 114 initiate (or "re-initiate") communication. The transaction device 260 can then check, at step 304, for incomplete transactions and reload at step 304 the transaction data in order to resume the transaction.

It is noted that the transaction recovery method described above has the effect of reducing transaction duration following an aborted transaction.

Storage of the transaction data during the transaction into the non-volatile memory 280 also helps mitigate against undesired updates in the transaction device 260 (for example, if the transaction device had already updated offline counters but the transaction was then aborted, reloading the stored data would prevent updating the offline counters for a second time, while only one transaction completed).

It is noted that power/data communication may be interrupted if the transaction device 260 is removed from the field of the POI 114 reader during a transaction (e.g. contactless card is not held within the contactless field of operation or the transaction device is removed too early from a POI reader).

The non-volatile memory 280 may comprise an encrypted portion and the transaction data may be stored within the encrypted portion.

Privacy of Public Key

In a payment system infrastructure in which a user uses a transaction device 102 (e.g. their integrated chip bank card) in a plurality of points of interaction 114 (POIs, e.g. card terminals) there exists the possibility that a unique identifier associated with the transaction device 102 could be tracked through the various POI interactions which may have implications for the privacy of the transaction device user.

When a transaction device 102 interacts with a POI 114, a payment application 122 on the transaction device 102 establishes a secure channel with the POI 114 so that transaction details and transaction device-holder identify information can be exchanged without being overheard or intercepted by an eavesdropper.

The architecture of a transaction device 102 in accordance with this aspect of the disclosure is described above in relation to FIGS. 1(a), 1(b), 2 and 3. One method of exchanging a secure channel may be achieved by the application authentication manager module using an Elliptic Curve Diffie-Hellman key exchange, an Elliptic Curve Digital Signature Algorithm or a Schnorr signature algorithm.

The operation of the Diffie-Hellman key exchange is detailed below in conjunction with FIG. 12.

The Diffie-Hellman key exchange protocol establishes a shared secret between two or more parties that can subsequently be used for secret communications over a communications channel. As can be seen in FIG. 12, Alice 340 and Bob 342 each have a private piece of information 346 and a shared piece of information 348.

They each combine their private information with the shared information 350 and then exchange this combined data at 352. It is assumed that it is computationally expensive to recover the private information from the combined data.

Each of Alice 340 and Bob 342 can then combine their private information with the combined data they have received at 354. This results in a shared piece of information, the shared secret 356.

For transaction devices 102 that comprise a registered public-private key pair and in order to minimise processing that needs to be carried out locally on the transaction device the Application Authentication manager (AAM) 124 may store a certified public key 126 (registered). This public key 126 may be used in setting up a channel between the transaction device 102 and the POI 114. Since the public key 126 is a static piece of data, however, it may be possible to track the use of the transaction device 102. It is noted that the transaction details would not be at risk and the cardholder identity would not be exposed but the use of the static public key 126 data may nevertheless allow the transaction device 102 to be tracked.

The present disclosure proposes an optimised version of the Diffie-Hellman exchange which addresses this issue.

In the present disclosure the application authentication manager 124 of the transaction device 102 may "blind" the static public key 126 with a randomly chosen factor. The use of a random factor means that it is not possible (or at the very least more difficult) to track the use of the transaction device 102 by tracking the communications issuing from the transaction device 102.

During the establishment of the secure channel the random factor is used twice by the transaction device 102, the first time is to blind the outgoing data the transaction device 102 sends to the POI 114 and the second time is on the data received from the POI 114 during channel establishment. As explained below this enables the POI 114 and the transaction device 102 to arrive at a shared secret/shared key which can then be used for subsequent communications.

The establishment of a secure channel is now described in accordance with the process flow 380 depicted in FIG. 13, the data exchange flow 382 depicted in FIG. 14 and the transaction device/POI arrangement 384 of FIG. 15. FIG. 15 shows a POI 114 and a transaction device 102. The transaction device 102 is configured to communicate with the POI 114 through a direct physical connection or using a 'contactless' induction connection.

The transaction device 102 comprises a public key 126, $Q_c$ that is stored in the AAM 124. The public key 126 is the product of a private key, $d_c$, and a point, G, on a curve which is part of an elliptic curve group (i.e. $Q_c=d_c \cdot G$). The private key is also stored on the transaction device within the AAM 124. It is noted that point G is also known to the POI 114 (the transaction device 102 and the POI 114 know the parameter G prior to the transaction occurring as this is a defined parameter of the overall transaction system).

Turning to FIGS. 13 and 14, in step 400 the transaction device 102 and POI 114 initiate a handshake communication indicating that a transaction is to be made. This may comprise inserting the transaction device 102 into a reader module associated with the POI 114 (e.g. inserting a chip-and-PIN card into a card terminal) or bringing a near field communication (NFC) enabled chip into proximity with an NFC reader.

Once the transaction device 102 and POI 114 know that a transaction is to be made then they begin the process of setting up a secure channel.

The transaction device 102 comprises a random number generator (within the AAM 124) and in step 402 the transaction device generates a random blinding integer r.

In step 404 the transaction device 102, computes R where $R=r \cdot Q_c$ and then in Step 406 sends this value to the POI 114.

The POI 114 may, in Step 408, generate an ephemeral private key $d_t$ and then generate, in step 410, an ephemeral public key $Q_t$ where $Q_t=d_t \cdot G$.

The ephemeral public key $Q_t$ may then be sent to the transaction device in Step 412.

In Step 414, the transaction device 102 receives the public key $Q_t$ from the POI 114 and uses this in Step 416 to generate the shared secret quantity $rd_c d_t \cdot G$.

In Step 418 the POI 114 receives quality R from the transaction device 102 and uses this in Step 420 to generate the secret quantity $rd_t d_c \cdot G$.

Following Steps 416 and 420, the POI 114 and transaction device 102 are in possession of a common shared secret. This can be used to compute a key K where $K_c=f(rd_c \cdot Q_t)$ and $K_t=f(d_t \cdot R)$, $K_c$ being equal to $K_t$.

The key K is therefore a shared K and this may be used in subsequent communications, step 422, to enable a secure communications channel to be used. Subsequent communications may use the authenticated encryption algorithm with $K_c$ for the card (transaction device 102) and $K_t$ for the terminal (POI 114).

It is noted that although steps 404 to 406 are described as preceding steps 408 to 412 above, the POI 114 may in fact calculate its public key, $Q_t$, and share this with the transaction device 102 before the transaction device 102 calculates quantity R.

Further, in FIG. 13, whilst step 412 is illustrated to occur before step 406, it is to be understood that in other embodiments, step 406 may occur before or simultaneously to step 412.

As a further alternative, following the handshake communication in step 400, the transaction device 102 and the POI 114 may calculate R and $Q_t$ substantially in parallel and then exchange in steps 406/412 and 414/418.

In order for the POI 114 to verify that the transaction device 102 is authentic, the transaction device 102 may, in step 424 send its public key 126 (now being sent over the secure channel and so not traceable by an eavesdropper), public key certificates and the blinding factor r generated in step 402 to the POI 114. The POI 114 receives this information in Step 426 and authenticates the transaction device in step 428.

It is noted that the authentication process in step 428 above comprises a number of actions such as: the POI 114 verifying a certificate chain associated with the transaction device 102 (this authenticates $Q_c$) which ensures that a transaction device 102 with such a public key exists and is registered to the overall transaction system; the POI 114 may verify that $R=r \cdot Q_c$ and thereby link $Q_c$ with the shared secret; and the POI 114 may verify the message authentication code (MAC) on messages received from the transaction device 102 (this step ensures that the transaction device is actually the transaction device since the MAC is linked to the private key of the transaction device and the shared secret).

Subsequent communication between the transaction device 102 and the POI 114 may in step 430 use an authenticated encryption algorithm with key $K_c$ for the transaction 102 device and key $K_t$ for the POI 114.

It is noted that steps 424, 426 and 428 may be omitted, either deliberately or because the transaction device 102 is not associated with a registered/certified public key, in which case the communication channel in step 430 would be secure but the POI 114 would not be able to authenticate the transaction device 102. It is noted that some transactions may be low risk or may not need the POI 114 to certify the public key 126. Therefore a payment application 122 may send its certified key to the POI 114 for certain transactions and not for other transactions. For example, for a POI 114 that operates in an online mode only (e.g. an ATM), during a transaction the issuer of the transaction card may authenticate the transaction device 102 and the cardholder. In this example, the authentication is performed by the issuer rather than the POI 114.

As noted above applying the Blinded Diffie-Hellman algorithm to establish the secure channel between the transaction device 102 and the POI 114 means that an observer of the key exchange will not see the public key 126 of the payment application 122 and will not be able to track the payment application/transaction device using that static public key.

The strength of the algorithm may be altered by changing the size of the blinding factor, r. If a short length blinding factor is used then an attacker still cannot directly observe the public key 126 but, at the cost of significant computation, may still be able to track the transaction device 102. If the size of the blinding factor is increased, these attacks become impractical. The size of the blinding factor therefore represents a transaction device 102 specific tradeoff between the need for privacy and an increased transaction time. A transaction device issuer may choose an appropriate level of privacy as needs dictate.

If a payment application 122 has no certified public key (registered), the application authentication manager 124 may use a random number instead of the private key and the public key certificate would not be sent to the POI 114. Alternatively, the public key certificate may be sent as an identifier with zero length value.

A typical transaction device 102 and point of interaction 114 arrangement 384 is shown in FIG. 15. In this example the transaction device 102 is in the form of a combined contact and contactless bank card 450 and the point of interaction 114 is a point of sale terminal. The card 450 may either be inserted into the slot 452 on the terminal or touched to the near field communication logo displayed on the screen 454 of the terminal.

In other embodiments, the application authentication manager 124 may use a variant of the Station-to-Station protocol, namely a one sided Station-to-Station protocol. Blinded Diffie-Hellman has benefits over other techniques such as one sided Station-to-Station. Firstly, if key derivation is done using a block cipher to hash the point on the elliptic curve, then no hash mechanism is needed on the transaction device itself. Secondly, the use of ephemeral keys for the key establishment rather than the transaction device certificate means that strong side channel defences are not needed in the transaction device. Thirdly, Blinded Diffie-Hellman is faster than Station-to-Station and is simpler to perform, this is of particular advantage as the transaction device may have limited system resources.

The Station to Station protocol would be carried out as below:
1. Transaction device 102 generates ephemeral private key $d_x$
2. Transaction device 102 generates ephemeral public key $Q_x = d_x \cdot G$
3. Transaction device 102 sends $Q_x$ to POI 114
4. POI 114 generates ephemeral private key $d_t$
5. POI 114 generates ephemeral public key $Q_t = d_t \cdot G$
6. POI 114 computes key $K_t = f(d_t \cdot Q_x)$
7. POI 114 sends $Q_t \| Alg(K_t)[Q_t \| Q_x]$ to transaction device 102, where Alg( ) is authenticated encryption
8. Transaction device 102 computes key $K_c = f(d_x \cdot Q_t)$ Subsequent communications use the authenticated encryption algorithm with key $K_c$ for the transaction device 102 and $K_t$ for the POI 114

9. Transaction device 102 sends certified public key and certificates and card-signed $Q_x \| Q_t$ to terminal.
10. POI 114 authenticates transaction device public key 126 using the certificates and validates card-signed $Q_x \| Q_t$.

After each transaction, the following sensitive data need to be erased by the AAM:
1. Transaction device 102 computed blinding factor or ephemeral key
2. $K_c$ and session keys derived from it Prevention of Relay Attacks FIG. 16(*a*) shows an example environment 470 in an embodiment of an aspect of the disclosure. A transaction device 472 is shown connected to a point of interaction (POI) 114. The POI 114 and transaction device 472 are temporarily connected for the purposes of carrying out a payment transaction. The POI 114 is operatively connected to a communications network 476. The communications network 476 allows two way data transfer between any of the entities connected to it. For example, the communications network 476 may be a local area network, wide area network or the Internet.

A transaction processing system 478 is also operatively connected to the communications network 476. The transaction processing system 478 is arranged to record payment transactions carried out between the transaction device 472 and the POI 114 and may also be used to authenticate and verify payment transactions.

Figure 16B:
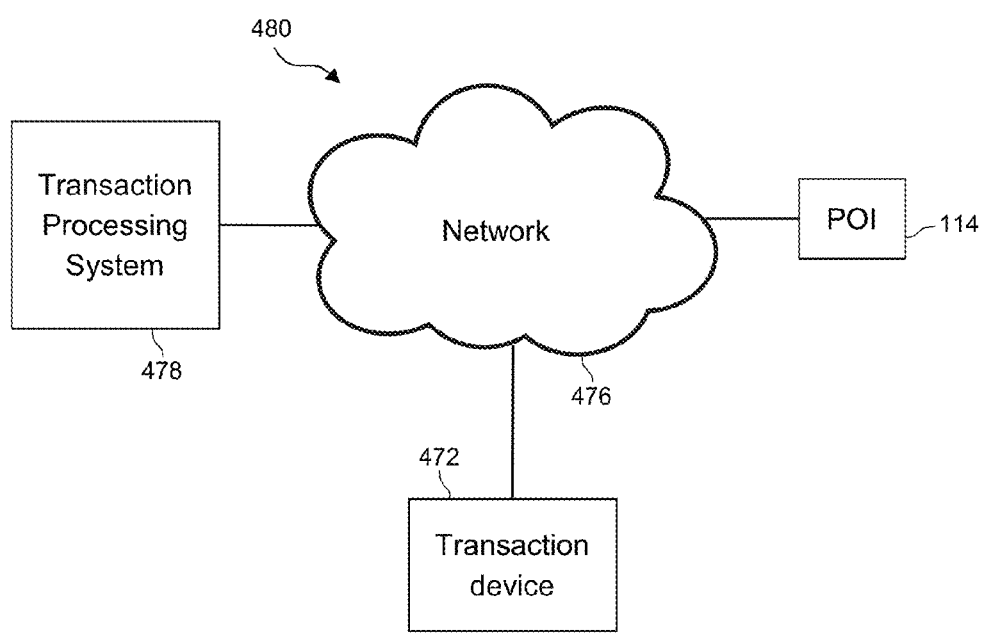

FIG. 16(*b*) shows an alternative example environment 480 whereby the transaction device 472 is connected to the communications network 476. In order to carry out a payment transaction, the transaction device 472 temporarily connects to the POI 114 via the communications network 476.

Fraud prevention is an important consideration in electronic authentication systems. One type of fraud that can potentially threaten the integrity of payment transaction systems is a relay attack. Relay attacks are described in more detail in GB 2462648A which discusses a method of preventing relay attacks between transaction devices and POIs.

Figure 17B:
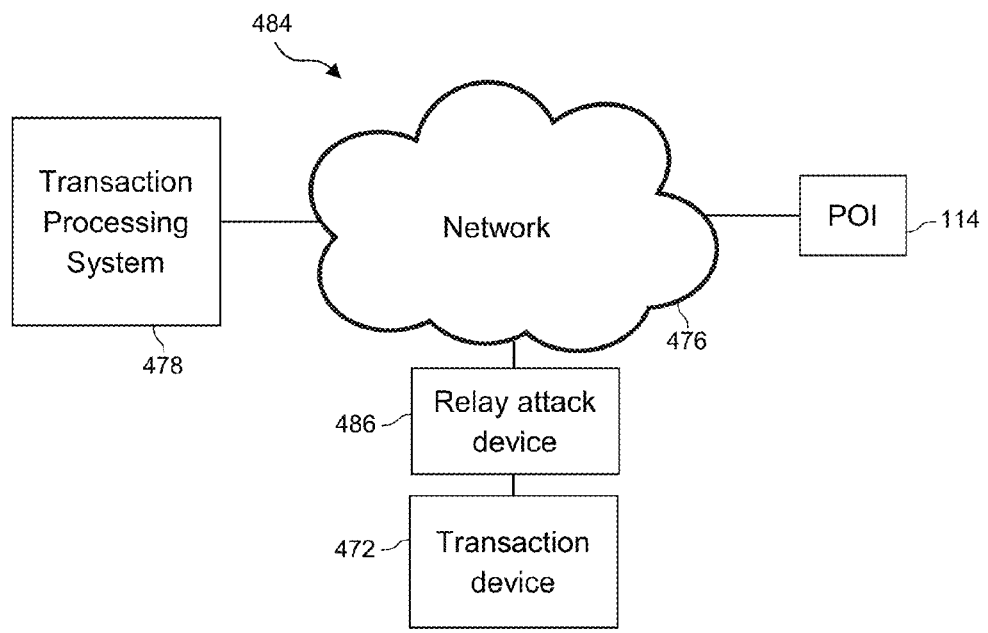

FIGS. 17(*a*) and 17(*b*) show the environments of FIGS. 16(*a*) and 16(*b*) as environments 482 and 484 respectively, with the additional of a relay attack device 486 intercepting communications between the transaction device 472 and the POI 114.

In summary, the method of GB 2462648A requires the POI 114 to send to the transaction device 472 a random number, UNp, and the transaction device 472 returns a different random number, UNc. The method requires that the random number exchange between the POI 114 and the transaction device 472 occurs in the shortest possible time. The transaction device 472 subsequently includes both random numbers in its digital signature. If the response time for the random number exchange is carried out within a predetermined limit and the transaction device 472 correctly uses both random numbers, the POI 114 is configured to trust that a relay attack is not occurring. This method is shown in the process 490 of FIG. 18.

A relay attack by a relay attack device 486 would introduce latency due to the additional receiving and sending communications by the relay and hence the response time taken for the random number exchange would be increased to beyond the predetermined time limit. In FIG. 19, the response time taken for the random number exchange is represented by the total length of the arrows 520 in both step 1 and step 2 for the normal transaction 522, and the arrows 524 in the transaction with the relay attack 526.

However, the method outlined in GB 2462648A is not completely secure against detecting relay attacks, particularly with the growing availability of near field communication devices (NFC) which could be used as relay attack devices 486. NFC devices such as some mobile phones, if they are fast enough to do a relay attack, make it easy to create a relay attack as only specialised software would be required and no specific hardware is needed. Also as networks get faster, the latency introduced by mobile phones decreases and thus relay attacks become less easily to detect.

Further, the method relies on the communication between the transaction device 472 and POI 114 to be very quick (and the predetermined time limit is set accordingly) but the communication time is governed by two factors; transmission time and processing time. Both the transmission times using different communication protocols and the processing time of the devices can vary greatly. These factors could increase the total response time to beyond the predetermined limit allowed by the POI 114, even when the transaction device 472 is attempting to perform a legitimate transaction, or require a predetermined limit that is too high to prevent detecting relay attacks.

If a relay attack is occurring it may be perceived either as an increase in the transmission time or as an increase in the processing time taken by the transaction device. As in the description below, the expected data transmission time is subtracted from the overall measured time to determine the processing time taken, any relay attack will result in the determined processing time increasing. This increase is used to detect the relay attack.

The processing time of the transaction device also depends on the function it is carrying out, whereas the transmission time should remain fairly constant for a given payment transaction.

FIG. 20 shows a transaction device 472 according to an aspect of the present disclosure. The transaction device 472 comprises an input/output module 550, a timer 552 and an unpredictable number generator 554 each connected to a processor 556.

The timer 552 is used to determine the processing time required by the unpredictable number generator 554 to generate the unpredictable (i.e. random) number. The transaction device 472 may also return the processing time for the random number exchange and an estimate of the time that the transaction device expects that it should take to transmit the data (i.e. the latency). The POI 114 may also be configured to measure the baud rate of the communication protocol in use and determine an expected transmission time for comparison with the reported transmission time. The POI 114 may be configured to measure the total response time, remove the transmission times and determine the processing time. If the measured and expected processing times differ by less than a predetermined threshold, then the POI 114 may be configured to trust that a relay attack is not occurring. FIG. 21 highlights the processing time, $T_c$, taken by the card as part of the total response time in the transactions of 522 and 526.

Transaction devices 472 may not have the capability to accurately measure time. Therefore, in other embodiments, the transaction device 472 may provide an estimated processing time based on its internal processing clock. The internal processing clock may be influenced by the attacker, may vary for different transaction devices and also, in the case of contactless integrated circuit chip cards, may vary depending on the power the received from the POI 114. In this case, the transaction device 472 may send a maximum possible and minimum possible value of processing time in the return communication of Step 2 in FIG. 21.

The POI 114 may also compare the actual processing time determined from the response time measurement and the transmission time to the minimum processing time that the device reports is possible and if the difference exceeds a POI threshold, the POI 114 may decide that it cannot be sure of the absence of a relay attack and refer the transaction to the Issuer. The POI 114 determined processing time and the transaction device 472 reported times would be communicated to the issuer so that it may make a decision.

A further benefit of sending processing time is that even with a fixed hardware configuration, the processor 556 of the transaction device 472 may be carrying out other tasks unrelated to the payment transaction. For example if the transaction device 472 was also a mobile phone and was performing other activities at the same time. In this example, the transaction device 472 would report to the POI 114 in the random number exchange that its processing time was long but this would not affect the function of the POI 114 to determine and compare the processing times and determine whether or not a relay attack is occurring if the processing time exceeds that reported by the transaction device 472.

It may also be the case that transmission errors may occur or unrelated processing in the transaction device 472 may occur which is not reflected in the transaction times communicated which results in the maximum measured processing time exceeding the transaction device's stated maximum. To prevent this and still permit a relay attack to be detected the POI 114 may be permitted a number of attempts. This would be limited by both POI 114 and transaction device 472 but would significantly improve reliability. A suitable limit might be three attempts, in the same way that the error correction protocols in contactless communications permit up to three attempts at recovery. It is important that each attempt use different random values.

eCAL

The utilities in the Communication Abstraction Layer (CAL) are discussed in more detail in the remainder of the description below, by way of example only, including the role of the proxy and proposes an implementing of the Mapping Utility for ISO 7816-4.

Communication Abstraction Layer (CAL)

This section describes each Utility of the CAL functionality in more detail. The following notation is used:

SvID identifies the product (and is equal to the AID/ADF Name when 7816-4 is used).

IntfID is the identifier of a communication technology (e.g. contact, contactless, Wi-Fi etc.); so List of IntfID is the list of communication technologies.

SessID is the session identifier (as seen by the lower layers) as well as the application handle (as seen by the upper layers)

Disconnect is a binary value (YES/NO), indicating whether the cardholder device should disconnect.

TxData is the transmit buffer, containing the data still to send; RxData indicates the received buffer, containing the data received so far.

ChID is the channel identifier.

Connection Utility

As indicated above, the Connection Utility is responsible for connection management, sending and receiving Protocol Data Units (PDUs) and providing symmetry.

(1) Connection Management

For control of the L1 devices, the CAL assumes that L1 devices support the following requests:

Activate (List of IntfID)
RequestChannel(IntfID)
SendPDU(IntfID, ChID, PDU)
Deactivate (List of IntfID)
Remove (List of IntfID)

Table 1 below describes the above terms in greater detail.

TABLE 1

CAL requests to L1 devices

| Request | Normal response | L1 Functionality | Exception |
|---|---|---|---|
| Activate (List of IntfID) | EV_DeviceDetected (IntfID) | Start timer for the various interfaces. Detect device presence. Take the first IntfID that responds, power on and set up communication. Deactivate other interfaces and ignore any response from other IntfIDs As only the response from the first IntfID is taking into consideration, a single Activate( ) request results in either a single EV_Opened event or a single EV_Error event. | EV_TimeOut (IntfID) if no device is detected on any interface within the foreseen time. IntfID is all zeroes in this case. EV_Error (IntfID) Multiple devices on this IntfID Comms cannot be established |
| Request Channel (IntfID) | EV_Channel Available (IntfID, ChID) | Allocate a channel for future communication over this channel. | EV_Error (IntfID) No free channel available |
| SendPDU (IntfID, ChID, PDU) | EV_Done ((IntfID, ChID, PDU) | Send a PDU and return the PDU (if any) received from the other device. Note: this approach allows both in-band as well as out-of-band. signaling | EV_Error (IntfID) Format error Syntax error . . . |
| Deactivate (List of IntfID) | EV_Device Deactivated (IntfID) | Terminate communication and power-off the device | |
| Remove (List of IntfID) | EV_Device Removed (IntfID) | Detect device removal | |

Channels are assigned to applications using the following mechanisms and logic:

The "Open" and "Resume" request from the upper layer is the trigger for the CAL to allocate a new channel—if needed. This new channel is the first channel available. The channel will be associated to a session identifier SessID and is hidden from the upper layer; only the session SessID identifier is visible to the upper layer.

Upon receipt of the "Close" or "Suspend" request, the CAL will free the channel.

As can be seen from

Table 1, CAL explicitly allocates a channel but does not explicitly de-allocate it. This is an implementation choice and other implementations may explicitly de-allocate the channel. The difference between explicit and implicit channel de-allocation is the following:

Explicit: the lower layer expects an explicit instruction to free the channel before an interface can be deactivated and the device disconnected. If not all channels of a particular interface are closed, a request to deactivate the interface and/or disconnect the device will be rejected.

Implicit: the lower layer closes the channel upon suspension or closure of the session and does not expect an explicit instruction to close the channel. If not all sessions of a particular interface are closed, a request to deactivate and/or disconnect the device will be rejected.

Exceptions on L1 have a specific error coding (e.g. L1_abc) to distinguish them from errors at the other layers.

(2) ABM

To enable either side of the link to initiate transmission of data, for each channel the CAL has a configurable timer of which the presence and/or time-out configuration value may vary with the mapping (and the interface, if we so desire).

If the timer is present, then processing is the following:

The timer is activated and the time-out value is set when the interface and mapping is determined.

The timer is started, when the CAL receives one of the following events from its lower layers:

EV_Done(IntfID, ChID, PDU) i.e. when then last data chunk of a message is received.

The timer is stopped when the CAL sends one of the following requests to its lower layers:

SendPDU(IntfID, ChID, PDU) i.e. at the beginning of a data exchange or signaling.

When the timer expires, the CAL sends a signaling message ('ping') to the other device.

The other device can respond with a signaling message ('pong') or with a data exchange.

Link Management Utility

The Link Management Utility serializes PDU exchanges that fit within the constraints of the lower layer (Wrapper APDUs in the case of ISO 7816-4), without imposing any limitation on the size of the messages that the upper layer can send or receive. It includes an Asynchronous Balanced Mode (ABM) i.e. a symmetry mechanism so that applications may send messages at any time, not bound by the limitation of the underlying protocol (e.g. half-duplex master-slave configuration for ISO 7816-4).

When the underlying layer does not allow sending a (data) message as a single packet, the CAL slices the message in smaller data chunks of a size that the underlying layer can accommodate and sends these data chunks across.

In a similar manner, the CAL reassembles data chunks received from its counterpart into a message.

To avoid any restriction on the size of a message that can be sent across, the following principle is used:

The CAL can split the payload in n data chunks of size m or smaller; both n and m are dependent on the underlying technology (and therefore the mapping).

For every data chunk, an extra leading byte is added. This extra byte is referred to as the Link Byte LB.

For all but the last data chunk, the link byte is set to 'M', indicating more data chunks will follow in order to complete the message. For the last data chunk of the message, the Link Byte is set to 'L', indicating this is the last data chunk of the message.

For migration purposes, we foresee a mechanism that the Link Byte could be extended to two or more bytes. The proposed mechanism is the following:

Every Link Byte includes an indication 'C' (=Continue) or 'E' (=End)

All but the last Link Byte associated to a data chunk have this indication set to 'C'

The last Link Byte associated to a data chunk has this indication set to 'E'

For now, all bits in all Link Bytes, except for the bits that include indications 'M'/'L' and 'C'/'E' are RFU.

Session Management Utility

The Session Management Utility manages the session and the messages that are exchanged with a session. The former results in signalling over the transaction device to POI interface, the latter results in data exchange. FIG. 22 shows an overview of the session management utility.

(1) Signalling

For session management and to trigger the signalling, the following service requests are proposed for the NGSE→CAL and the NGApp→CAL interface:
OpenSession(SvID, List of IntfID)
SuspendSession (SessID, Disconnect)
ResumeSession(List of IntfID [in most cases, this list will contain a single IntfID], SessID)
CloseSession(SessID, Disconnect)

The responses to these service requests, from the CAL to the upper layer are listed in Table 2 below, together with the functionality of the CAL. CAL functionality includes requests to the lower layer—see "(1) Connection management" above.

TABLE 2

CAL functionality for managing application context

| Interaction upper layer and CAL | CAL Functionality | Signal interface @ CAL level | Exception |
|---|---|---|---|
| OpenSession(SvID, List of IntfID) ↓ ↑ EV_Opened(IntfID, SessID) | Assign a new session (SessID) identifier to this connection and create an entry with this SessID. Request lower layer to Activate (List of IntfID) - to activate various interfaces and detect interface used. Upon receipt of EV_Detected(InfID) from lower layer, select the mapping in function of IntfID and request a channel from the lower layer through RequestChannel(IntfID) Upon receipt of EV_ChannelAvailable (IntfID, ChID) from lower layer, update entry with IntfID and ChID. In function of the mapping, open application context on other device, using SvID received. Set the Status of the entry to 'Open'. At this stage, the entry is characterized by the tuple (SessID, SvID, IntfID, ChID, Mapping, Status = 'Open'). Upon receipt of S(EV_ACK) from other device, return EV_Opened(IntfID, SessID) to upper layer. | S(Open, SvID) → S(EV_ACK, SessID) ← | EV_TimeOut(SessID) if device is not found. EV_Error(IntfID, SessID, error) with error: Connection cannot be established No new session available More than 1 device SvID not compatible with mapping (e.g. cannot be mapped to Bluetooth) S(EV_NACK), indicating that application cannot be opened SessID returned is all zeroes in the error case. |
| ResumeSession (List of IntfID, SessID) ↓ ↑ EV_Resumed(IntfID, SessID) | Retrieve tupple linked to SessID Request lower layer to Activate (List of IntfID) - to activate various interfaces and detect interface used. Upon receipt of EV_Detected(InfID), select the mapping in function of IntfID, check whether this | S(Resume, SessID) → S(EV_ACK, SessID) ← | EV_TimeOut(SessID) if device is not found. EV_Error(IntfID, SessID, error) with error: No such SessID Connection cannot be established More than 1 device SvID not compatible with mapping S(EV_NACK), |

TABLE 2-continued

CAL functionality for managing application context

| Interaction upper layer and CAL | CAL Functionality | Signal interface @ CAL level | Exception |
|---|---|---|---|
| | mapping is compatible1 with previous mapping and update the mapping in the tupple. Request a channel from the lower layer through RequestChannel(IntfID). Upon receipt of EV_ChannelAvailable (IntfID, ChID) from lower layer, update IntfID and ChID in the tupple. If function of the mapping, re-open application context on other device, using SvID stored with SessID, and set the Status of the entry to 'Resume'. The entry is characterized by the tuple (SessID, SvID, IntfID, ChID, Mapping, Status = 'Resume'). Upon receipt of S(EV_ACK) from other device, return EV_Resumed(IntfID, SessID) to upper layer. | | indicating that application cannot be opened |
| SuspendSession (SessID, Disconnect) ↓ ↑ EV_Suspended (SessID) | In function of the mapping, request other device to suspension application context. Set the Status of the entry to 'Suspend' and update the tupple. Upon receipt of S(EV_ACK), store the application context of the current application in this device - if needed - and call lower layer If (Disconnect = Yes) then request Remove (IntfID) from lower layer Else request Deactivate (IntfID) from lower layer Upon receipt of EV_DeviceRemoved(IntfID)/ EV_DeviceDeactivated (IntfID from lower layer, return EV_Suspended(IntfID, SessID) to upper layer and clear IntfID and ChID from entry. | S(Suspend, SessID, Disconnect) → S(EV_ACK, SessID) ← | EV_TimeOut(SessID) if device is not removed. EV_Error(IntfID, SessID, error) with error: No such SessID S(EV_NACK), indicating that application rejects suspension Device cannot be removed because of other session Device is removed prematurely |
| CloseSession(SessID, Disconnect) ↓ ↑ EV_Closed(SessID) | In function of the mapping, request other device to close its application context. Set the Status of the | S(Close, SessID, Disconnect) → S(EV_ACK, SessID) ← | EV_TimeOut(SessID) if device is not removed. EV_Error(SessID, error) with error: No such SessID Device cannot be |

TABLE 2-continued

CAL functionality for managing application context

| Interaction upper layer and CAL | CAL Functionality | Signal interface @ CAL level | Exception |
|---|---|---|---|
| | entry to 'Close' and update the tupple. Upon receipt of S(EV_ACK), call lower layer If (Disconnect = Yes) then request Remove (IntfID) Else request Deactivate (IntfID) Upon receipt of EV_DeviceRemoved(IntfID)/ EV_DeviceDeactivated (IntfID) from lower layer, return EV_Closed(IntfID, SessID) and erase entry (incl SessID). | | removed because of other session in progress S(EV_NACK), indicating that application rejects closure |

The service request from the upper layer will generate Signals on the interface between the two devices, as illustrated by the "Signal Interface @ CAL Level" column in Table 2 above. FIG. 23 gives an example for the OpenSession(SvID, List of IntfID) service request, that gives origin to an S(Open, SvID) signaling request at the CAL level. Then S(EV_ACK,SessID) signalling response from the other device results in the EV_Opened(IntfID, SessID) to the upper layer.

"CAL Signalling" discussed below includes a more detailed description of the communication between the upper and lower layer within the CAL, as well as the CAL signalling with the other device. The Example section below covers the four service requests: Open, Resume, Suspend and Close.

(2) Data Exchange

The following service requests are proposed for the NGSE→CAL and the NGApp→CAL interface:

SendMsg (SessID, Msg)

CAL functionality includes requests to the lower layer and involves link management. For these lower layer requests, please refer to the section "(1) Connection management" and "Link Management Utility" (see FIG. 24).

Proxy Functionality

For the connection management, the proxy has to ensure that connections are available over the different interfaces. This implies coordinating the following service request on various L1 devices:

Activate (List of IntfID)
RequestChannel(IntfID)
SendPDU(IntfID, ChID, PDU)
Deactivate (List of IntfID)
Remove (List of IntfID)

For link management, the proxy compiles the incoming PDUs received over one interface into a message and then disassembles it into PDUs again for another interface. For session management, the proxy transcodes the service request OpenSession( . . . ), SuspendSession ( . . . ), ResumeSession( . . . ), CloseSession( . . . ) received over one interface to the other interface. It ensures the consistency around the SessID.

Mapping Utility for ISO 78614-4

The Message Mapping Utility plugs the Connection Utility, Link Management Utility and Session Management Utility onto an existing protocol, such as ISO 7816-4.

This section proposes an implementation for ISO 7816-4 that is fully compliant with EMV Book 1—section 11.1 and describes this implementation by means of some examples.

Example Implementation

For POI to transaction device communication, the following C-APDUs may be used:

The Select command, to open an application and to resume an application.

The Wrapper command, for everything else—this case 4 C-APDU has functionality similar to the ISO defined Envelope command but is an EMVCo proprietary version. The command data of the Wrapper C-APDU always includes Signalling Link (layer) information through the link byte(s)

If the Wrapper command data includes additional data, then this additional data constitutes the actual data exchange. Data exchange includes:

Session Identifier SessID
Other data

For transaction device to POI communication, the following R-APDUs and status bytes SW1SW2 may be used:

For a SvID linked to a NGApp, the response to a Select command is SW1SW2 with no additional data The response R-APDU to a Wrapper command always includes response data and has SW1SW2 equal to 9000.

This response data always includes

Signaling

Link (layer) information through the Link Byte(s)

If the response data includes additional data, then this additional data constitutes the actual data exchange. Data exchange includes:

Session Identifier (SessID)
Other data

For ISO7816-4, signalling is done in-band. Data exchange and signalling are combined in a single C-APDU or R-APDU. For signalling, there may be a specific byte, preceding the Link Byte, and this byte is referred to as the Signalling Byte (SB).

For migration purposes, there may be a mechanism that the Signalling Byte could be extended to two or more bytes. The proposed mechanism is the following (and similar to the mechanism used for the Link Byte):

Every Signalling Byte includes an indication 'C' (=Continue) or 'E' (=End)

All but the last Signalling Byte associated to a data chunk have this indication set to 'C'

The last Signalling Byte associated to a data chunk has this indication set to 'E'

Note: having multiple bytes allows sending multiple signals across in parallel if we ever need this.

On top of the coding above, we define the following values for the Signal Byte:

No signalling—this value is also used for ABM 'ping' and 'pong'
Open
Resume
Suspend with Disconnect
Suspend without Disconnect
Close with Disconnect
Close without Disconnect
ACK
NACK For the L1 connection management, mapping is described in Table 3 below.

TABLE 3

L1 functionality for ISO 7816-4

| | Mapping | | | |
|---|---|---|---|---|
| Request | T = 0 | T = 0 | T = CL; Type A | T = CL; Type B |
| Activate (List of L1ID) | Detect power, followed by cold & warm reset | | Detect field of sufficient level and wait for polling command and subsequent ISO 14443-4 commands. | |
| RequestChannel (IntfID) | Check whether there is still a channel available and if so, return this value. | | | |
| SendPDU(IntfID, ChID, PDU) | Wait for a PDU with ChID set in the CLA byte and return the PDU. | | | |
| | Mapping of ISO7816-4 to T = 0 | Mapping of ISO7816-4 to T = 1 | Mapping of ISO7816-4 to ISO/IEC 14443-4 | |
| Deactivate (List of L1IDs) | VCC is off and remove contact | | Field off | |
| Remove (List of L1IDs) | | | As longs as the field strength is sufficient, respond to the ISO 1443-4 commands of the EMV - Book D Removal sequence | |

TABLE 4

Mapping to R-APDU
R-APDU

| | | | Response data | Response trailer | |
|---|---|---|---|---|---|
| SB | LB | Data | | SW1 | SW2 |

TABLE 5

Format of C-APDU
C-APDU

| WRAPPER command header | | | | | Command data | | |
|---|---|---|---|---|---|---|---|
| CLA | INS | P1 | P2 | Lc | SB | LB | Data |

For ABM using ISO 7816-4, the timer will be present in the POI i.e. the master of the ISO 7816-4 communication. The transaction device does not implement a timer.

If the POI, ABM related processing is the following:
Following a C-APDU that has its LB set to 'L',
when an R-APDU is received with the LB set to 'M',
a C-APDU is sent with
SB set to 'No Signalling' and with the
LB set to 'L'.

From the upper layer, the link management utility in the CAL will get a message that has the format SessID‖Other data. The Link Management Utility will break it down in Protocol Data Units (PDUs) that have the format SB‖LB‖Data. These PDUs are delivered in sequence to the lower layer that will package them response R-APDUs (see Table 4) to Wrapper C-APDUs (see Table 5).

From the lower layer, the link management utility will get PDUs that have the format SB‖LB‖Data. If the Signal Byte SB is other than "No Signaling", the CAL creates an event for the signaling event for upper layer. All data received from the PDUs are concatenated (after SB and LB overhead has been removed) in the RxData receive buffer until the Link Byte LB indicates 'L'. Upon receipt of an LB equal to 'L', the link management utility adds the last data chunk. The data in the RxData receive buffer is now a complete message and should have the format SessID‖Other data.

For consistency, the SessID may be sent as well, if this would be useful.
This C-APDU is then the so-called 'ping' signal.
a when an R-APDU is received with the LB set to 'L', then the timer is started.
The timer is stopped when a C-APDU is sent
When the timer expires, a 'ping' signal is sent.
If the card, ABM related processing is the following:
Following receipt of a C-APDU that has its LB set to 'L',
the CAL does its normal processing when it has data to send
the CAL does it normal checking on the channel ChID and if it has no data to send on this ChID, the CAL returns a PDU with SB set to 'No Signalling' and with the LB set to 'L'.
For setting the value of the logical channel, there are two options:
a) The CAL in POI sets the value or
b) The eCAL in the transaction device sets the value If the POI sets the value, it will do so through the Select command or by the Manage Channel command.

If the transaction device sets the value, it will do so as part of the Manage Channel command processing.

Mechanism for setting the channel value based on Select command and Manage Channel command are described in ISO 7816-4: Interindustry Commands for Interchange.

Once a channel is allocated to an application and therefore a session, the (logical) channel of this application is coded in the lower nibble of the CLA byte of every C-APDU of this session.

For ISO7816-4, there is a one-to-one mapping between sessions and channels. This one-to-one mapping is illustrated in the example below.

Example: If the Transaction Manager sends
- Open Application (NGSE) creating a first session with SessID1 followed by Open Application (Credit Bank A) creating a second session with SessID2, then two channels will be opened. SessID1 will run over channel 0 (ChID=0) and SessID2 will run over channel 1 (ChID=1).
- Open Application (NGSE), creating a first session with SessID1 followed by a Close Application (SessID1), Open Application (Credit Bank A), creating another session with SessID2, then both SessID1 and SessID2 will run over channel 0 (ChID=0).

The eCAL links a SessID to a ChID and makes sure that the PDUs received with a ChID are assembled into a message from session SessID.

In turn, the eCAL breaks a message from session SessID down in PDUs that can be sent on channel ChID. So the eCAL has to wait for a PDU with a matching ChiD in the CLA byte before it can send the PDU.

EXAMPLES

The remainder of this section contains some examples and illustrations of the ISO 7816-4 mapping FIG. 25 illustrates how messages are sliced into smaller data chunks that are put into PDUs, with a Signal Byte and a Link Byte, and mapped onto APDUs. Each APDU has a Link Byte indicating whether there is more data to come ('M') or whether this is the last data APDU ('L') from the message (or signal).

In this example, the message from the upper layer needs to be split into two chunks: Payload (1T) and Payload (2T). The first byte of the command data is each time the Signal Byte SB. The second byte of the command data is each time the Link Byte LB. The Link Byte in the first Wrapper C-APDU is set to 'M', to announce that there is another C-APDU to come (from the same message). The Link Byte of the second Wrapper C-APDU is set to 'L'.

The message from the transaction device is split in three data chunks: Payload (1C), Payload (2C) and Payload (3C). The first byte of the response data is each time the Signal Byte SB. The second byte is each time the Link Byte LB. The Link Byte of the first and second R-APDU is set to 'M' and the Link Byte of the third R-APDU is set to 'L'.

All Signal Bytes are set to "No Signalling" in this example.

In FIG. 25, the third C-APDU functions as the 'ping' signal. The payload in this third C-APDU may be merely the Session Identifier (SessID).

Starting from FIG. 25, the timeout of the ABM feature is illustrated in FIG. 26.

If after having received the third R-APDU from the transaction device, completing the message transfer from the transaction device to the POI, the POI has no more messages to send and neither has the card—at this particular time. So the CAL in the POI will start a timer and upon expiration of this timer, the CAL will send a Wrapper C-APDU with the Signal Byte set to 'No Signaling'—as a 'ping' signal. If the transaction device has no message to send, it simply returns an R-APDU with the Signal Byte set to 'No Signaling' as well (and the Link Byte equal to 'L')—as 'pong' signal. If the transaction device has a message to send, it returns a first R-APDUs, including the Link Byte indicating whether there are more R-APDUs to come or not.

FIG. 27 gives an illustration how the link layer may work in combination with multiple sessions.

In this example, two applications run in parallel, so there are two sessions: SessID1 and SessID2 running over ChID1=0 and ChID2=1 respectively.

The POI message from SessID1 is split into two Wrapper C-APDUs, with the ChID1=0 coded in the lower two bits of the CLA byte. The transaction device message is split in to R-APDUs as well (with no indication of the channel).

The POI message from SessID2 is a single Wrapper C-APDUs and has ChID2=1 coded in its CLA byte; the transaction device message from SessID2 is a single R-APDU.

The two C-APDUs from SessID1 are interleaved with the C-APDU from SessID2, as do the R-APDUs.

Below are some examples of session management requests sent by the upper layer. Each of the requests is described from the point of view of the POI as well as the point of view of the transaction device. Requests from the upper layer that are covered are:

Open
Resume
Suspend with or without Disconnect
Close with or without Disconnect

Open

Table 6 describes the Open request when the POI initiates the request. Table 7 is similar, where the transaction device initiates the request.

TABLE 6

| Open (POI to transaction device) | | | |
|---|---|---|---|
| POI upper layer | CAL Interface | L1 - Mapping in POI | ISO7816-4 |
| OpenSession(SvID, List of IntfID) | S(Open, SvID) → | Map S(Open, . . .) to select command and SvID to AID. Check for free channel and if one available, set the channel in the SELECT command. Set Status of SessID to 'Open' | |
| | | | SELECT (AID) → SW1SW2 ← |

TABLE 6-continued

| Open (POI to transaction device) | | | |
|---|---|---|---|
| POI upper layer | CAL Interface | L1 - Mapping in POI | ISO7816-4 |
| EV_Opened(IntfID, SessID) | S(EV_ACK, SessID) ← | Maps SW1SW2 = 9000 to S(EV_ACK, SessID), resulting in EV_Opened( ) to be sent to upper layer. | |

TABLE 7

| Open (Transaction device to POI) and first exchange | | | |
|---|---|---|---|
| Transaction device upper layer | CAL Interface | L1 -Mapping in Transaction device | ISO7816-4 |
| OpenSession(SvID, List of IntfID) | n.a. | Maps the SvID into an ADF Name and creates entries for the various interfaces. Set the Status of entries to "Open" | |
| | S(Open, SvID) ← | For the interface used, check whether entries are available for one or more ADF Names If so, check AID against ADF Name. For matching ADF Name, remove entries related to other interfaces. Map the matching ADFName to Product ID Set channel | SELECT (AID) ← |
| | S(EV_ACK, SessID) → | Acknowledge opening of the session. | SW1SW2 → |
| EV_Opened(IntfID, SessID) | | Depending on the Status of the entry If Status is "Continue" or "Suspend", then SessID is already assigned. Just move on to updating the receiver buffer and analyzing the link byte. If Status is equal to "Open" or "Resume" then check whether Signal byte in the C-APDU matches the value (If not, then reject without waiting for the other message data ) of the Status of this entry. Initialize SessID based on value in this C-APDU, based on layout of command data     Signal    Link    SessID    Other data For "Open", return EV_Opened(IntfID, SessID) to upper layer; For "Resume", then return EV_Resumed(IntfID, SessID) Set Status to "Continue". | WRAPPER ← |
| EV_ReqReceiveMsg(SessID, Msg) | DE(SessID, Msg) ← | Add data other than Signal Byte and Link Byte to the RxData receive buffer. Check the Link Byte. If Link Byte indicates 'L', then all data for the message has been received and the chain/receive buffer should have the format as indicated below.     SessID            Other data Check SessID Send ReqReceiveMsg(SessID, Msg) to upper layer. Check whether there is more data to send in the transmit buffer. | R-APDU (. . .) → |

Suspend

Table 8 describes the Suspend request when the transaction device initiates the request.
Table 9 is similar wherein the POI initiates the request.

TABLE 8

Suspend (Transaction device to POI)

| Transaction device upper layer | CAL Interface | L1 -Mapping in Transaction device | ISO7816-4 |
|---|---|---|---|
| SuspendSession (SessID, Disconnect) | | Lookup ChID based on SessID and wait for C-APDU to come along with right ChID in its CLA byte. | WRAPPER ← |
| EV_ReqReceiveMsg (SessID, Msg) | DE(SessID, Msg) ← | Process received data. | |
| | DE(SessID, Msg) → | Check whether there are APDUs to send in the TxData transmit buffer. Based on the Link Byte, if this is the last APDU to send (Link Byte = 'L'), then set Signal Byte to "Suspend" and set Status of entry to 'Suspend'. | R-APDU (. . .) → |
| | S(Suspend, SessID, Disconnect) → | | |
| | S(EV_ACK, SessID) ← | If Status of entry is 'Suspend' and Signal Byte is 'ACK', then store context info. | WRAPPER ← |
| EV_Suspended (SessID) | | Send single R-APDU, with Signaling Byte set to 'No Signaling' Send EV_Suspended to upper layer | R-APDU (. . .) → |

TABLE 9

Suspend (POI to transaction device)

| POI upper layer | CAL Interface | L1 -Mapping in POI | ISO7816-4 |
|---|---|---|---|
| SuspendSession (SessID, Disconnect) | | | R-APDU (. . .) ← |
| EV_ReqReceiveMsg (SessID, Msg) | DE(SessID, Msg) ← | Process received data. | |
| | DE(SessID, Msg) → | Check whether there are APDUs to send in the TxData transmit buffer. Based on the Link Byte, if this is the last APDU to send (Link Byte = 'L'), then set Signal Byte of this PDU to "Suspend". Set Status of this entry to 'Suspend' | WRAPPER (. . .) → |
| | S(Suspend, SessID, Disconnect) → | | |
| | S(EV_ACK, SessID) ← | Extract SessID. If Status of this entry is 'Suspend' and Signal Byte is 'ACK', then store context info. | R-APDU (. . .) ← |
| EV_Suspended (SessID) | | Depending on value of Disconnect, request lower layer to Deactivate (IntfID) or Remove (IntfID) Upon acknowledgment of lower layer, send EV_Suspended to upper layer | |

Resume

Table 10 describes the Resume request when the POI initiates the request. Table 11 is similar wherein the transaction device initiates the request.

TABLE 10

Resume (POI to transaction device)

| POI | CAL Interface | L1 -Mapping in POI | ISO7816-4 |
|---|---|---|---|
| ResumeSession (SessID, List of IntfID) | S(Resume, SessID) → | Look up AID name based on SessID. Map S(Resume, . . .) to SELECT command. Check for free channel and if one available, set the channel in the SELECT command. Set Status of SessID to "Resume" | |
| | | | SELECT (AID) → SW1SW2 ← |
| EV_Resumed(IntfID, SessID) | S(EV_ACK, SessID) ← | Restore the transaction context Maps SW1SW2 = 9000 to S(EV_ACK, SessID), resulting in EV_Suspended( ) to be sent to upper layer. | |

TABLE 11

Resume (Transaction device to POI) and first exchange

| Transaction Device | CAL Interface | L1 -Mapping in Transaction Device | ISO7816-4 |
|---|---|---|---|
| ResumeSession (SessID, List of IntfID) | n.a. | Look up the SessID in the context and check whether its status is 'Suspend'. If so, activate the matching entries for the various interfaces. Set the Status of entries to "Resume". | |
| | S(Resume, SessID) ← | For the interface used, check whether entries are available for one or more ADF Names If so, check AID against ADF Name. For matching ADF Name, remove entries related to other interfaces. Map the matching ADFName to Product ID Set channel | SELECT (AID) ← |
| | S(EV_ACK, SessID) → | Acknowledge opening of the session. | SW1SW2 → |
| EV_Resumed(IntfID, SessID) | | Depending on the Status of the entry If Status is "Continue" or "Suspend", then SessID is already assigned. Just move on to updating the receiver buffer and analyzing the Link Byte. If Status is equal to "Open" or "Resume" then check whether Signal byte in the C-APDU matches the value (If not, then reject without waiting for the other message data) of the Status of this entry. Initialize SessID based on value in this C-APDU, based on layout of command data Signal    Link    SessID   Other data For "Open", return EV_Opened(IntfID, SessID) to upper layer; For "Resume", then return EV_Resumed(IntfID, SessID) Set Status to "Continue". | WRAPPER ← |

TABLE 11-continued

Resume (Transaction device to POI) and first exchange

| Transaction Device | CAL Interface | L1 -Mapping in Transaction Device | ISO7816-4 |
|---|---|---|---|
| EV_ReqReceiveMsg (SessID, Msg) | DE(SessID, Msg) ← | Add data other than Signal Byte and Link Byte to the receive buffer RxData. Check the Link Byte. If Link Byte indicates 'L', then all data for the message has been received and the chain/receive buffer should have the format as indicated below.<br>SessID    Other data<br>Check SessID<br>Send ReqReceiveMsg(SessID, Msg) to upper layer.<br>Check whether there is more PDUs to send in the transmit buffer TxData. | R-APDU (. . .) → |

Close

Table 12 describes the Close request when the POI initiates the request. Table 13 is similar wherein the transaction device initiates the request.

TABLE 12

Close (POI to transaction device)

| POI upper layer | CAL Interface | L1 -Mapping in POI | ISO7816-4 |
|---|---|---|---|
| CloseSession(SessID, Disconnect) | | | R-APDU (. . .) ← |
| EV_ReqReceiveMsg (SessID, Msg) | DE(SessID, Msg) ← | Process received data. | |
| | DE(SessID, Msg) → | Check whether there is more PDUs to send in the transmit buffer TxData. Based on the Link Byte, if this is the last PDU to send (Link Byte = 'L'), then set Signal Byte to "Close". Set Status of Entry to 'Close' | WRAPPER (. . .) → |
| | S(Close, SessID, Disconnect) → | | |
| | S(EV_ACK, SessID) ← | Extract SessID. If Status of this entry is "Close" and if Signal byte is 'ACK', then erase context info. | R-APDU (. . .) ← |
| EV_Closed (SessID) | | Depending on value of Disconnect, request lower layer to<br>Deactivate (IntfID)<br>or<br>Remove (IntfID)<br>Upon acknowledgment of lower layer, send EV_Closed to upper layer and erase entry. | |

TABLE 13

Close (Transaction device to POI)

| Transaction device upper layer | CAL Interface | L1 -Mapping in transaction device | ISO7816-4 |
|---|---|---|---|
| CloseSession(SessID, Disconnect) | | Lookup ChID based on SessID and wait for C-APDU to come along with right ChID in its CLA byte. | WRAPPER ← |

TABLE 13-continued

Close (Transaction device to POI)

| Transaction device upper layer | CAL Interface | L1 -Mapping in transaction device | ISO7816-4 |
|---|---|---|---|
| EV_ReqReceiveMsg (SessID, Msg) | DE(SessID, Msg) ← | Process received data. | |
| | DE(SessID, Msg) → | Check whether there is more PDUs to send in the transmit buffer TxData. Based on the Link Byte, if this is the last PDU to send (Link Byte = 'L'), then set Signal Byte to "Close". Set status of entry to 'Close' | R-APDU (. . .) → |
| | S(Close, SessID, Disconnect) → | | |
| | S(EV_ACK, SessID) ← | If status of entry is 'Close' and if Signal Byte is 'ACK', then erase context info. | WRAPPER ← |
| EV_Closed (SessID) | | Send single R-APDU, with Signaling Byte set to 'No Signalling' Send EV_Closed to upper layer and erase entry. | R-APDU (. . .) → |

Table 14 describes a SendMsg request when the POI initiates the request. Table 15 is similar wherein the transaction device initiates the request.

TABLE 14

Message exchange (POI to transaction device)

| POI upper layer | CAL Interface | L1 -Mapping in POI | ISO7816-4 |
|---|---|---|---|
| SendMsg (SessID, Msg) | DE(SessID, Msg) → | Split into PDUs and set the Link Byte for each PDU. Set ChID into CLA of C-APDU. If Status of SessID equal to "Open" then set Signal Byte of first C-APDU to "Open" "Resume" then set Signal Byte of first C-APDU to "Resume" Set Status of SessID to "Continue" Map first chunk into Wrapper C-APDU. The result will look like:<br>  SB    LB    SessID    Other data<br>This first C-APDU will provide the card with the SessID. | WRAPPER (. . .) → |
| EV_MsgTx(SessID) | | If LB of the C-APDU to send is 'L' (so this was the last chunk of the message to transmit), then send EV_MsgTx(SessID) to upper layer. | |
| | DE(SessID, Msg) ← | Check Signal Byte and if different from "No Signaling", create the matching event for the upper layer. Add data (other than SB and LB) to RxData buffer. Check the Link Byte. If Link Byte indicates 'M' then just continue | R-APDU (. . .) ← |
| EV_ReqReceiveMsg(SessID, Msg) | | If the Link Byte indicates 'L', then all data for the message has been received and the RxData buffer should now contain data as indicated below.<br>     SessID            Other data<br>Check SessID Send ReqReceiveMsg(SessID, Msg) to upper layer. | |

TABLE 15

| Transaction device upper layer | CAL Interface | L1 -Mapping in transaction device | ISO7816-4 |
|---|---|---|---|
| SendMsg (SessID, Msg) | DE(SessID, Msg) → | Split into PDUs and set the Link Byte for each PDU. Lookup ChID based on SessID and wait for C-APDU to come along with right ChID in its CLA byte. -APDU. Check Signal Byte and if different from "No Signaling", create the matching event for the upper layer. Add data (other than SB and LB) to RxData buffer. Check the Link Byte. If Link Byte indicates 'M' then just continue, otherwise package the RxData into EV_ReqReceiveMsg(SessID, Msg) for upper layer. | WRAPPER (. . .) ← |
| EV_ReqReceiveMsg (SessID, Msg) | DE(SessID, Msg) ← | | |
| EV_MsgTx (SessID) | | Map PDU from Tx-Buffer into R-APDU. The result will look like Repeat the above until LB of the R-APDU to send is 'L' (so this was the last chunk of the message to transmit), then send EV_MsgTx(SessID) to upper layer. | R-APDU (. . .) |

Message exchange (Transaction device to POI)

CAL Signalling

Table 16, Table 17, Table 18 and Table 19 below summarize the communication between the upper and lower layer within the CAL, as well as the CAL signalling with the other device for Open, Resume, Suspend and Close respectively. Please note that in these tables, no distinction is made between a "master" and a "slave" device as no such distinction needs to be made at the upper layer and at the signalling layer.

TABLE 16

CAL functionality - Open

| Device (internal) | | | CAL signaling | Other device (internal) | |
|---|---|---|---|---|---|
| Upper layer | CAL | Lower layer | interface | CAL | Upper layer |
| OpenSession (SvID, List of IntfID) ↓ | | | | | |
| | Activate (List of IntfID) ↓ | | | | |
| | | EV_Detected (IntfID) ↑ | | | |
| | RequestChannel (IntfID) ↓ | | | | |
| | | EV_Channel Available (IntfID, ChID) ↑ | | | |
| | | | S(Open, SvID) → | | |

TABLE 16-continued

| CAL functionality - Open | | | | | |
|---|---|---|---|---|---|
| Device (internal) | | | CAL signaling | Other device (internal) | |
| Upper layer | CAL | Lower layer | interface | CAL | Upper layer |
| | | | | EV_ReqOpenSession (SvID, IntfID) ↑ | |
| | | | | | OpenSession (SvID, IntfID) ↓ |
| | | | S(EV_ACK, SessID) ← | | |
| EV_Opened (IntfID, SessID) ↑ | | | | | |

TABLE 17

| CAL functionality - Resume | | | | | |
|---|---|---|---|---|---|
| Device (internal) | | | CAL signaling | Other device (internal) | |
| Upper layer | CAL | Lower layer | interface | CAL | Upper layer |
| ResumeSession (List of IntfID, SessID) ↓ | | | | | |
| | Activate (List of IntfID) ↓ | | | | |
| | | EV_Detected (InfID) ↑ | | | |
| | RequestChannel (IntfID) ↓ | | | | |
| | | EV_Channel Available (IntfID, ChID) ↑ | | | |
| | | | S(Resume, SessID) → | | |
| | | | | EV_ReqResumeSession (IntfID, SessID) ↑ | |
| | | | | | ResumeSession (IntfID, SessID) ↓ |
| | | | S(EV_ACK, SessID) ← | | |
| EV_Resumed (IntfID, SessID) ↑ | | | | | |

TABLE 18

CAL functionality - Suspend

| Device (internal) | | | CAL signaling interface | Other device (internal) | |
|---|---|---|---|---|---|
| Upper layer | CAL | Lower layer | | CAL | Upper layer |
| SuspendSession (SessID, Disconnect) ↓ | | | | | |
| | | | S(Suspend, SessID, Disconnect) → | | |
| | | | | EV_ReqSuspendSession (SessID, Disconnect) ↑ | |
| | | | | | SuspendSession (SessID, Disconnect) ↓ |
| | | | S(EV_ACK, SessID) ← | | |
| | Remove (IntfID)/ Deactivate (IntfID) ↓ | | | | |
| | | EV_DeviceRemoved (IntfID)/ EV_DeviceDeactivated (IntfID) ↑ | | | |
| EV_Suspended (SessID) ↑ | | | | | |

TABLE 19

CAL functionality - Close

| Device (internal) | | | CAL signaling interface | Other device (internal) | |
|---|---|---|---|---|---|
| Upper layer | CAL | Lower layer | | CAL | Upper layer |
| CloseSession (SessID, Disconnect) ↓ | | | | | |
| | | | S(Close,SessID, Disconnect) → | | |
| | | | | EV_ReqCloseSession (SessID, Disconnect) ↑ | |
| | | | | | CloseSession (SessID, Disconnect) ↓ |
| | | | S(EV_ACK, SessID) ← | | |

TABLE 19-continued

CAL functionality - Close

| Device (internal) | | | CAL signaling | Other device (internal) | |
|---|---|---|---|---|---|
| Upper layer | CAL | Lower layer | interface | CAL | Upper layer |
| | Remove (IntfID)/ Deactivate (IntfID) ↓ EV_Device Removed (IntfID)/ EV_DeviceDeactivated (IntfID) ↑ | | | | |
| EV_Closed (SessID) ↑ | | | | | |

CAL Data Exchange

Table 20 summarizes the communication between the upper and lower layer within the CAL, as well as the CAL signaling with the other device for data exchange.

Please note that in the data exchange is represented as a full duplex exchange, with messages being sent in parallel between the two devices.

TABLE 20

CAL functionality - SendMsg

| Device (internal) | | | CAL signaling | Other device (internal) | | |
|---|---|---|---|---|---|---|
| Upper layer | CAL | Lower layer | interface | Lower layer | CAL | Upper layer |
| SendMsg (SessID, Msg) ↓ | | | | | | SendMsg (SessID, Msg) ↓ |
| | SendPDU(IntfID, ChID, PDU) ↓ | | | | | |
| | | EV_Done((IntfID, ChID, PDU) ↑ | | | SendPDU(IntfID, ChID, PDU) ↓ | |
| | ... | | | EV_Done((IntfID, ChID, PDU) ↑ | ... | |
| | | SendPDU(IntfID, ChID, PDU) ↓ | | | | |
| | | EV_Done((IntfID, ChID, PDU) ↑ | | | SendPDU(IntfID, ChID, PDU) ↓ | |
| | | | | | EV_Done((IntfID, ChID, PDU) ↑ | |
| | | | DE(SessID, Msg) → DE(SessID, Msg) ← | | | |
| EV_MsgTx(SessID) ↑ | | | | | | EV_ReqReceiveMsg (SessID, Msg) ↑ |
| EV_ReqReceiveMsg (SessID, Msg) ↑ | | | | | | EV_MsgTx(SessID) ↑ |

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

What is claimed is:

1. A transaction device for establishing a shared secret with a point of interaction (POI) over a communications network to enable encrypted communications between the transaction device and the point of interaction, the device comprising:
an input arranged to receive communications from the point of interaction;
a processor arranged to generate a first communication according to a Diffie-Hellman protocol;
an output arranged to send the first communication to the point of interaction;
wherein the processor is arranged to apply a randomly generated blinding factor, r, and a static public key, Qc, when generating the first communication, the static public key being unknown to the point of interaction prior to the first communication being generated; and
wherein, in response to receiving a second communication from the point of interaction at the input, the second communication having been generated according to the Diffie-Hellman protocol, the processor is arranged to apply the randomly generated blinding factor and generate a shared secret according to the Diffie-Hellman protocol in dependence on data contained within the second communication.

2. A transaction device according to claim 1, comprising a random number generator for generating the blinding factor r.

3. A bank transaction card comprising the transaction device according to claim 1.

4. A transaction device according to claim 1, wherein the processor is arranged to use an elliptic Diffie-Hellman protocol.

5. A transaction device according to claim 1, wherein the public key Qc is a product of a private key $d_c$ and a point G on a curve that is part of an elliptic group.

6. A transaction device according to claim 5, wherein point G is known to the transaction device and the point of interaction prior to the first communication being generated.

7. A transaction device according to claim 5, wherein the processor is arranged to calculate R, wherein R=r·Qc; and
wherein the processor is arranged to append R to the first communication, for use by the point of interaction in generating the shared secret.

8. A transaction device according to claim 7, wherein the second communication comprises an ephemeral public key $Q_t$ of the point of interaction where $Q_t=d_t·G$ and $d_t$ is an ephemeral private key of the point of interaction.

9. A transaction device according to claim 8, wherein the processor is arranged to generate the shared secret by combining the public key from the second communication with private key $d_c$ and applying the blinding factor r to generate $rd_c d_t·G$.

10. A transaction device according to claim 9, wherein, in response to generating the shared secret, the processor is arranged to generate a further communication to the point of interaction, the further communication comprising the public key of the transaction device, security certificates and the blinding factor r, the further communication being encrypted in dependence with the shared secret.

11. A transaction device according to claim 1, wherein the processor is arranged to calculate key $K_c$ wherein $K_c=f(rd_c·Q_t)$, where $Q_t$ is received from the point of interaction; and
wherein the processor is further arranged to encrypt a subsequent communication with the point of interaction using the key $K_c$.

12. A transaction device according to claim 11, wherein at an end of a communication session with the point of interaction, the processor is arranged to delete the random blinding factor r and the key $K_c$.

13. A mobile communications device comprising the transaction device according to claim 1.

14. A mobile communications device according to claim 13, wherein the mobile communications device comprises a secure element, the transaction device being located at least partially within the secure element.

15. A method of establishing a shared secret between a transaction device and a point of interaction (POI) over a communications network to enable encrypted communications between the transaction device and the point of interaction, the method comprising:
generating, at the transaction device, a first communication according to a Diffie-Hellman protocol, in dependence on a randomly generated blinding factor, r, and a public key, Qc, of the transaction device;
sending the first communication to the point of interaction;
in response to receiving a second communication from the point of interaction at the input, generating a shared secret according to the Diffie-Hellman protocol in dependence on data contained within the second communication, a private key of the transaction device, and the blinding factor, r;
after generating the shared secret, generating a further communication to the point of interaction, the further communication including the public key, Qc, of the transaction device and the blinding factor, r; and
sending the further communication to the point of interaction, thereby permitting the point of interaction to authenticate the static public key, Qc.

16. A method according to claim 15, wherein the first communication includes R, which is a product of the blinding factor, r, and the public key, Qc.

17. A method of claim 15, wherein generating a further communication includes encrypting the further communication in dependence with the shared secret.

18. A method of establishing a shared secret between a transaction device and a point of interaction (POI) over a communications network to enable encrypted communications between the transaction device and the point of interaction, the method comprising:
generating, at the point of interaction, a first communication, the first communication including a public key, Qt;
sending the first communication to the transaction device;
receiving a second communication from the transaction device, the second communication including a value R;
in response to the second communication, generating a shared secret according to the Diffie-Hellman protocol in dependence on the value R and a private key, $d_t$, of the point of interaction;
receiving a third communication, via a secure channel, the channel being secured by the generated shared secret, the third communication including a public key, Qc, of the transaction device and a randomly generated blinding factor, r; and checking, by the point of interaction, the value R based on the public key, Qc, of the transaction device and the randomly generated blinding factor, r.

19. A method according to claim 18, wherein the value R comprises a product of the randomly generated blinding factor, r, and the public key, Qc, of the transaction device; and wherein the shared secret comprises a product of R and the private key, $d_t$, of the point of interaction.

20. A method according to claim 18, further comprising authenticating the public key, Qc, thereby confirming the transaction device.

* * * * *